(12) United States Patent
Aisu et al.

(10) Patent No.: US 11,586,221 B2
(45) Date of Patent: Feb. 21, 2023

(54) TRAVEL CONTROL DEVICE, TRAVEL CONTROL METHOD AND COMPUTER PROGRAM

(71) Applicant: KABUSHIKI KAISHA TOSHIBA, Tokyo (JP)

(72) Inventors: Hideyuki Aisu, Kawasaki (JP); Shizu Sakakibara, Kawasaki (JP); Takufumi Yoshida, Funabashi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 7 days.

(21) Appl. No.: 17/015,313

(22) Filed: Sep. 9, 2020

(65) Prior Publication Data

US 2021/0286373 A1 Sep. 16, 2021

(30) Foreign Application Priority Data

Mar. 16, 2020 (JP) .............................. JP2020-045748

(51) Int. Cl.
*G05D 1/02* (2020.01)
*G08G 1/16* (2006.01)
*G08G 1/123* (2006.01)

(52) U.S. Cl.
CPC ........... *G05D 1/0289* (2013.01); *G08G 1/123* (2013.01); *G08G 1/166* (2013.01); *G05D 2201/0216* (2013.01)

(58) Field of Classification Search
CPC ...... G05D 1/02; G05D 1/0289; G05D 1/0287; G08G 1/16; G08G 1/123; G08G 1/166
See application file for complete search history.

(56) References Cited

U.S. PATENT DOCUMENTS 5,038,290 A 8/1991 Minami
5,283,739 A * 2/1994 Summerville ....... G05D 1/0289
700/255

(Continued)

FOREIGN PATENT DOCUMENTS

JP 07-019177 B2 3/1995
JP 2953282 B2 9/1999

(Continued)

OTHER PUBLICATIONS

U.S. Appl. No. 16/564,539, filed Sep. 9, 2019, AISU.

*Primary Examiner* — Tan Q Nguyen
(74) *Attorney, Agent, or Firm* — Oblon, McClelland, Maier & Neustadt, L.L.P.

(57) ABSTRACT

A travel control device includes: a controller configured to control traveling of a plurality of mobile objects on a basis of a travel schedule of the mobile objects; a planner configured to generate a plurality of tentative travel schedules by changing part of the travel schedule; an evaluation value calculator configured to calculate evaluation values of the tentative travel schedules based on state features of the mobile objects in the tentative travel schedules; and a model including the state features of the mobile objects and evaluation values associated with them. The evaluation value calculator calculates the evaluation values based on the model and the state features of the mobile objects in the tentative travel schedules. The planner performs search calculation of repeating to select one tentative travel schedule from the tentative travel schedules based on the evaluation values, and to update the travel schedule with the one tentative travel schedule.

7 Claims, 20 Drawing Sheets

(56) References Cited

U.S. PATENT DOCUMENTS

| | | | |
|---|---|---|---|
| 5,625,559 A | 4/1997 | Egawa | |
| 7,873,469 B2 | 1/2011 | D'Andrea et al. | |
| 7,920,962 B2 | 4/2011 | D'Andrea et al. | |
| 8,068,978 B2 | 11/2011 | D'Andrea et al. | |
| 10,803,420 B2 * | 10/2020 | Jarvis | G05D 1/0274 |
| 10,956,855 B1 * | 3/2021 | Coughran | G06N 20/00 |
| 2008/0051984 A1 * | 2/2008 | Wurman | G06Q 50/30 |
| | | | 701/532 |
| 2014/0032035 A1 * | 1/2014 | Thomson | G05D 1/0291 |
| | | | 701/25 |
| 2014/0100735 A1 * | 4/2014 | Yoneda | G05D 1/0223 |
| | | | 701/25 |
| 2017/0169366 A1 * | 6/2017 | Klein | G06Q 10/047 |
| 2020/0039747 A1 * | 2/2020 | Ahmann | G05D 1/0225 |
| 2020/0293063 A1 | 9/2020 | Aisu et al. | |

FOREIGN PATENT DOCUMENTS

| | | |
|---|---|---|
| JP | 2000-285373 A | 10/2000 |
| JP | 3364021 B2 | 1/2003 |
| JP | 2004-280213 | 10/2004 |
| JP | 5997092 B2 | 9/2016 |
| JP | 2020-30724 A | 2/2020 |
| JP | 2020-149370 A | 9/2020 |

\* cited by examiner

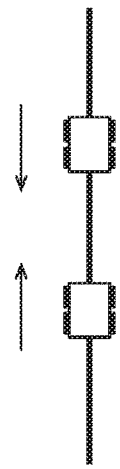
DEADLOCK
FIG. 3A
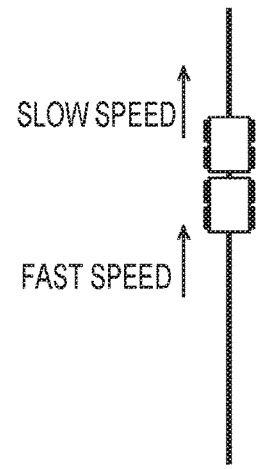
COLLISION
FIG. 3B
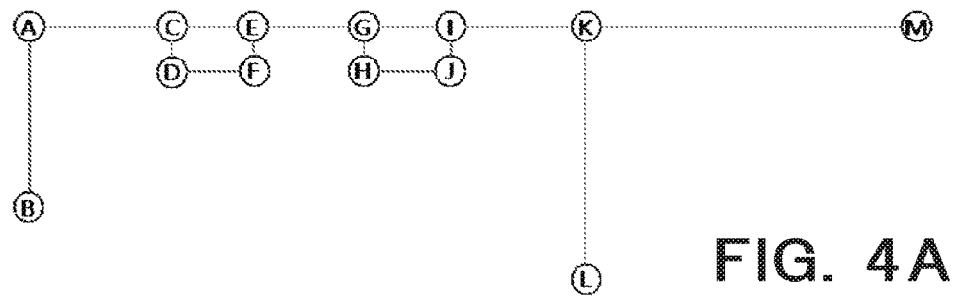
FIG. 4A
```
A,20,20
B,20,120
C,100,20
D,100,40
E,140,20
F,140,40
G,200,20
H,,200,40
I,240,20
J,240,40
K,320,20
L,320,160
M,500,20
```
FIG. 4B
```
1, A,B
2, A,C
3, C,E
4, C,D
5, D,F
6, E,F
7, E,G
8, G,I
9, G,H
10, H,J
11, I,J
13, I,K
14, K,L
15, K,M
```
FIG. 4C , K, I, G, E, C, A, B, A, C, D, F, E, G, H, J, I, K, M,
K, I, G, E, C, A, B, A, C, D, F, E, G, H, J, I, K, L
L

ROUTE PLAN: EXAMPLE 1

L-Load, K, I, G, E, C, A, B-UnLoad, A, C, D, F, E, G, H, J,
I, K, M-Load, K, I, G, E, C, A, B-UnLoad, A, C, D, F, E, G,
H, J, I, K, L

ROUTE PLAN: EXAMPLE 2

EXAMPLE OF TRAVEL TIMING SCHEDULES OF MOBILE OBJECTS AGV 0, AGV 1 AND AGV 2

AGV0
MOVE-L-K-70.0, MOVE-K-I-37.0, MOVE-I-G-10.0, WAIT-52.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-L-70.0,

AGV1
MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, WAIT-8.0, MOVE-I-K-37.0, WAIT-229.0, MOVE-M-K-104.0, WAIT-40.0, MOVE-K-M-104.0, MOVE-I-G-10.0, MOVE-G-E-36.0, MOVE-E-C-10.0, WAIT-229.0, MOVE-C-A-47.0, MOVE-A-B-45.0,

AGV2
MOVE-K-I-37.0, MOVE-I-G-10.0, MOVE-G-E-36.0, MOVE-E-C-10.0, WAIT-20.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-8.0, MOVE-I-K-37.0, MOVE-K-L-70.0, WAIT-40.0, MOVE-K-L-70.0, MOVE-K-I-37.0, WAIT-64.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-16.0, MOVE-I-K-37.0,

FIG. 7

L DEPARTURE: 0

K ARRIVAL 70, DEPARTURE 70

I ARRIVAL 107, DEPARTURE 107

G ARRIVAL 117, DEPARTURE 169

| SEARCH DEPTH | MOBILE OBJECT 1 | | MOBILE OBJECT 2 | | MOBILE OBJECT 3 | | MOBILE OBJECT 4 | | EVALUATION VALUE |
|---|---|---|---|---|---|---|---|---|---|
| | CURRENT POSITION | REMAINING TRAVEL DISTANCE | CURRENT POSITION | REMAINING TRAVEL DISTANCE | CURRENT POSITION | REMAINING TRAVEL DISTANCE | CURRENT POSITION | REMAINING TRAVEL DISTANCE | |
| 1 | AREA 1 | 100 | AREA 2 | 120 | AREA 3 | 75 | AREA 3 | 170 | 1900 |
| 2 | AREA 2 | 90 | AREA 3 | 100 | AREA 4 | 50 | AREA 4 | 130 | 1730 |
| ... | | | | | | | | | ... |
| 99 | AREA 1 | 10 | AREA 3 | 30 | AREA 3 | 0 | AREA 3 | 80 | 370 |
| 100 | AREA 1 | 0 | AREA 2 | 0 | AREA 3 | 0 | AREA 4 | 0 | 0 |

FIG. 9

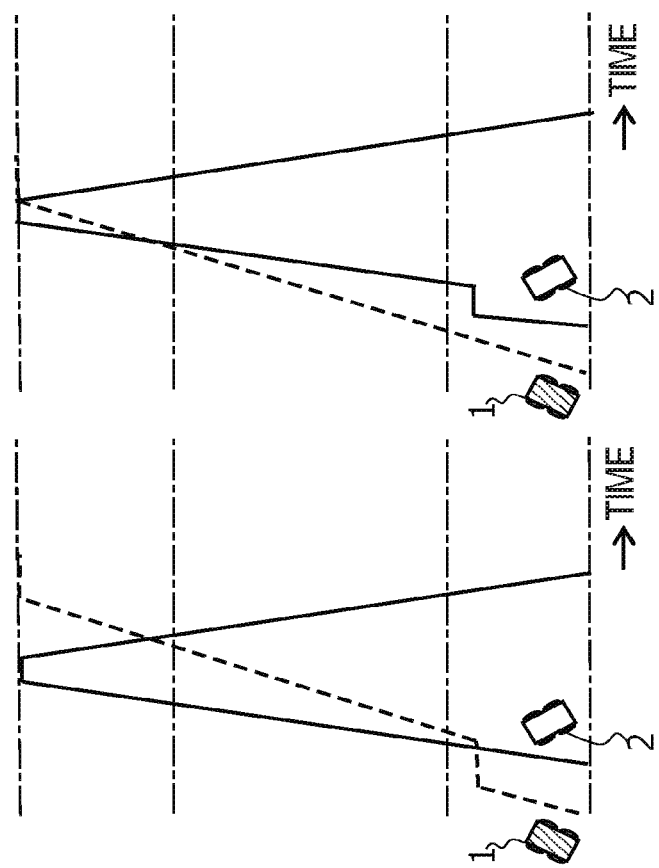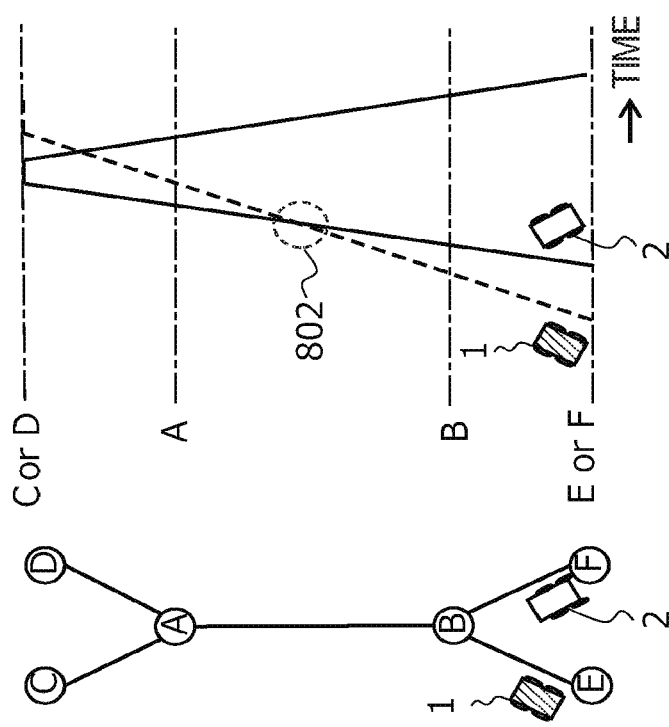
FIG. 14A  FIG. 14B  FIG. 14C  FIG. 14D

US 11,586,221 B2

TRAVEL CONTROL DEVICE, TRAVEL CONTROL METHOD AND COMPUTER PROGRAM

CROSS REFERENCE TO RELATED APPLICATIONS

This application is based upon and claims the benefit of priority from the prior Japanese Patent Application No. 2020-045748, filed on Mar. 16, 2020, the entire contents of which are incorporated herein by reference.

FIELD

Embodiments described herein relate to a travel control device, a travel control method and a computer program.

BACKGROUND

In a case where a plurality of mobile objects are caused to travel at the same time, if collisions among mobile objects, congestion, or the like, occur, efficiency as an entire system is low. Travel control for causing a plurality of mobile objects to efficiently travel is desired.

BRIEF DESCRIPTION OF THE DRAWINGS

FIGS. 3A and 3B each are a diagram illustrating an example of conflict between mobile objects;

FIGS. 4A to 4C each show a diagram illustrating an example of traveling network structure information;

FIG. 7 is a diagram illustrating an example of travel timing schedules of a plurality of mobile objects;

FIG. 8 illustrates an example of part of a travel plan;

FIG. 9 is a diagram illustrating an example of state features of a plurality of mobile objects;

FIGS. 14A to 14D each are a diagram illustrating another example of conflict check and avoidance processing;

DETAILED DESCRIPTION

Figure 1:
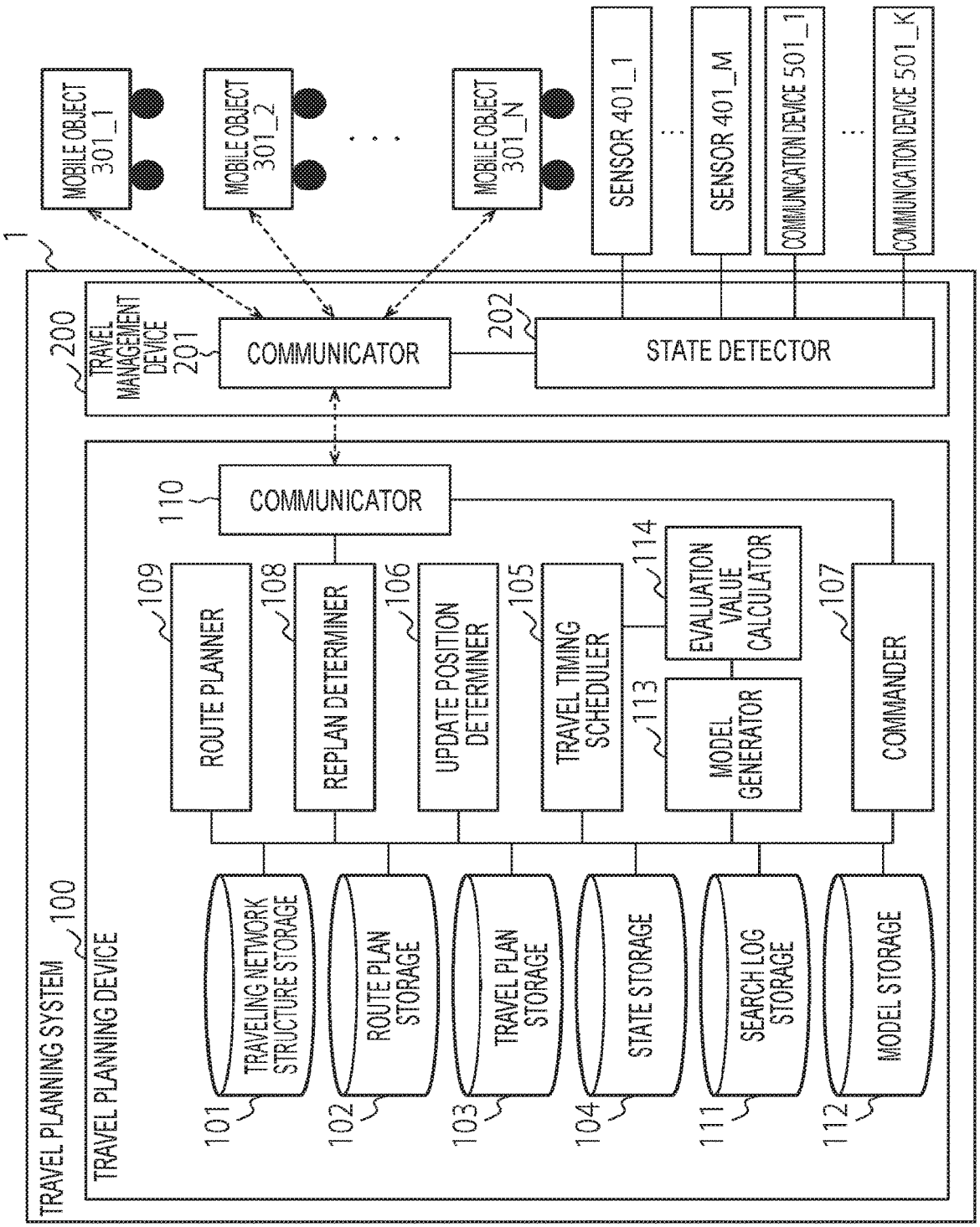
FIG. 1 is a diagram illustrating an example of an entire system configuration including a travel planning system according to a first embodiment.

A travel control device includes: a controller configured to control traveling of a plurality of mobile objects on a basis of a travel schedule of the plurality of mobile objects; a planner configured to generate a plurality of tentative travel schedules by changing part of the travel schedule; an evaluation value calculator configured to calculate evaluation values of the tentative travel schedules on a basis of state features of the plurality of mobile objects in the tentative travel schedules; and a model in which the state features of the plurality of mobile objects are associated with evaluation values. The evaluation value calculator calculates the evaluation values on a basis of the model and the state features of the plurality of mobile objects in the tentative travel schedules, and the planner performs search calculation of repeating to select one tentative travel schedule from the plurality of tentative travel schedules on a basis of a plurality of the evaluation values, and to update the travel schedule with the one tentative travel schedule.

Technical background of the present embodiment will be described.

In recent years, along with generalization of high-mix low-volume production, flexibility has been required in production process. For example, respective steps in a production line are modularized and freely reassembled, an AGV (Automatic Guided Vehicle) performs conveyance between the steps, and a working mobile robot with an arm is caused to work while moving among a plurality of work areas.

Further, with a serious manpower shortage at logistics sites as background, approaches for saving manpower are accelerating in distribution centers of online shopping, and the like. For example, the approaches include combination of: an AGV or an autonomous traveling forklift; and a picking robot.

Still further, along with development of autonomous driving technology of vehicles, trials for autonomous valet parking in which vehicles are caused to autonomously travel and park at a parking area in an unmanned state have reached practical use. Also, traveling of an unmanned construction mobile object which is remotely operated at a construction site, a mine, or the like, have reached practical use.

To efficiently control movement of a number of autonomous traveling mobile objects in a narrow area, it is necessary to avoid conflict among the mobile objects, such as a collision and/or deadlock. Until now, the conflict has been typically avoided by providing in advance traveling paths with a plurality of lines on which mobile objects can travel in both directions at the same time, a plurality of one-way loops, and dedicated traveling paths and traveling space in a grid shape, or the like.

In a related art, on the assumption that such dedicated traveling paths, or the like, are used, a plan is made so that movement in reverse directions on the same traveling path does not occur in all paths of the mobile objects. However, in a case where a stepwise introduction is promoted while existing paths which are also used by workers are diverted, a system which can generally make a travel plan is required in the following cases: a case where traveling paths of a shape in which movement in the both directions occurs is used, and a case where a path on which movement in both directions occurs is designated in advance for a reason of safety, or the like. It is difficult to apply the above-described related art under this condition.

Further, as another related art, a traveling plan of a mobile object is determined (a mobile object is reserved) one by one, and a traveling plan of the next mobile object is determined so that traveling in a direction reverse to that of the mobile object reserved previously does not occur. In this related art, there has been a problem that traveling efficiency is largely affected by reservation order of mobile objects, which degrades entire efficiency.

Further, use of dedicated traveling paths, or the like, requires construction cost, and there is also a problem that stepwise change of traveling path layout after utilization is started is not easy.

The present embodiment realizes efficient traveling while preventing occurrence of conflict such as a collision or deadlock among mobile objects in a case where a plurality of mobile objects such as AGVs and mobile robots are caused to travel in this manner. While, in the present embodiment, a mobile object which travels on a dedicated traveling path such as a rail and a guide tape laid in advance is dealt with as a mobile object as an example, the present embodiment can be also applied to an autonomous traveling mobile object which travels while identifying an own position on a free plane. The present embodiment will be described in detail below.

Below, embodiments will be described below with reference to the drawings.

FIG. 1 illustrates an example of an entire system configuration including a travel planning system according to a first embodiment. The entire system configuration includes a travel planning system 1, a plurality of mobile objects 301_1 to 301_N, a plurality of sensors 401_1 to 401_M, and a plurality of communication devices 501_1 to 501_K. The travel planning system 1 includes a travel planning device 100 and a travel management device 200. An arbitrary mobile object will be described as a mobile object 301. An arbitrary sensor will be described as a sensor 401. An arbitrary communication device will be described as a communication device 501.

The travel planning device 100 and the travel management device 200 may exist on the same computer system. Alternatively, the travel planning device 100 and the travel management device 200 may exist on different computer systems and may be connected to each other via a network.

The travel planning system 1 efficiently controls operation of a number of mobile objects autonomously traveling at low speed in a travel network including a plurality of traveling paths disposed in a narrow area as a whole so that conflict such as deadlock and a collision does not occur.

The mobile objects 301_1 to 301_N are moving vehicles which can autonomously move such as AGVs (Automatic Guided Vehicles), autonomous mobile robots, and autonomous traveling vehicles (for example, autonomous traveling vehicles) as one example. The mobile objects 301_1 to 301_N travel in a travel network disposed in an area such as, for example, in a factory, in a warehouse, and in a facility site.

Figure 2:
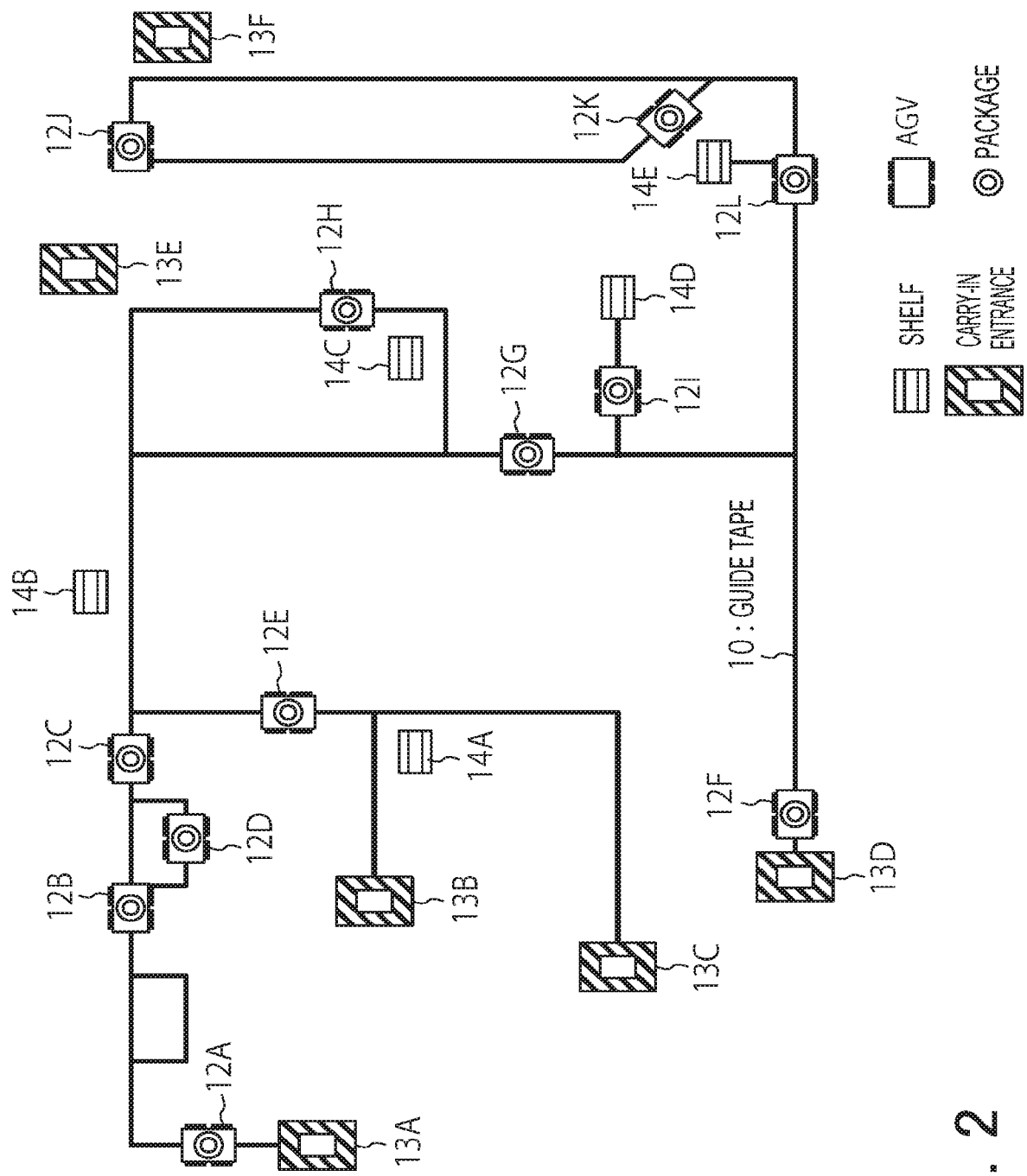
FIG. 2 is a diagram illustrating an example of a travel network.

FIG. 2 is a top view illustrating an example of the travel network. FIG. 2 schematically illustrates aspect where operation of a plurality of mobile objects is controlled in the travel network. The travel network using a guide tape 10 is disposed on a floor of a certain facility. The travel network is configured by linear guide tapes 10 being combined as traveling paths. In this example, while each traveling path has a linear shape, the shape is merely an example. The traveling path may have a curve shape or a shape in which a linear line and a curve line are combined. Note that there are a plurality of methods other than the method using guide tapes, such as a method in which markers are disposed at points on the traveling path, and a case where the mobile object itself detects an own position and travels on a virtual travel network. The method for realizing the travel network is not limited here.

The mobile objects 12A, 12B, 12C, 12D, 12E, 12F, 12G, 12H, 121, 123, 12K and 12L, which correspond to the mobile object 301 in FIG. 1, can move in an anterior direction, in a posterior direction or both in the anterior direction and in the posterior direction along the guide tapes 10. The mobile objects may be configured to be able to rotate so that an anterior portion and a posterior portion are inverted. Further, the mobile objects may be configured to be able to move in directions other than the anterior direction and the posterior direction, such as an oblique direction depending on a shape of the traveling path.

Carry-in entrances 13A, 13B, 13C, 13D, 13E and 13F and shelves 14A, 14B, 14C, 14D and 14E are provided at end portions of the traveling paths and near intersection portions (for example, junction portions) of the traveling paths. At all or part of the shelves 14A to 14E and the carry-in entrances 13A to 13F located at the end portions of the traveling paths, near the intersection portions of the traveling paths, in midstream of the traveling paths (between the both ends of the traveling paths) and at other arbitrary portions, sensors 401 and communication devices 501 in FIG. 1 are disposed.

The mobile objects 12A to 12L move on the respective traveling paths under management by the travel planning system 1 in FIG. 1 and do work instructed in advance. For example, the mobile objects 12A to 12L receive package from the carry-in entrances, carry the received baggage to the shelves and pile up the package. Further, the mobile objects 12A to 12L carry down the package from the shelves and carry the package to the carry-in entrances. Double circles in the drawing schematically indicate the package. Each mobile object automatically performs the movement and work on the basis of movement command data provided from the travel planning system 1. Note that the work is not limited to conveyance of package, and can be merely movement without work.

The travel planning device 100 according to the present embodiment generates a route plan indicating a path on which each mobile object should travel on the basis of content of work and order of work to be done by each mobile object. There is also a case where a route plan of each mobile object is provided in advance. The travel planning device 100 generates a traveling plan (hereinafter, referred to as a travel timing schedule) in which timings of travel of each mobile object on traveling paths are included on the basis of the route plan so that a collision or deadlock does not occur at each mobile object. The travel management device 200 controls operation of each mobile object by transmitting the movement command data based on the travel timing schedule of each mobile object to each mobile object. Further, the travel management device 200 detects a state of each mobile object and manages operation of each mobile object.

Here, the deadlock is a state where an arbitrary mobile object cannot move to an arbitrary intersection portion (for example, a junction portion) or to an end portion of a traveling path in the traveling network. The collision is contact between a mobile object and another mobile object.

FIG. 3A illustrates an example of the deadlock, and FIG. 3B illustrates an example of the collision. In FIG. 3A, two mobile objects travel in directions reverse to each other on the same traveling path. It is assumed that the two mobile objects can only move forward. In this case, the two mobile objects cannot move to an arbitrary intersection portion or end portion, and deadlock occurs. In FIG. 3B, while two mobile objects travel in the same direction on the same traveling path, because speed of the mobile object which travels behind is higher than speed of the mobile object which travels ahead, the mobile object which travels behind collides with the mobile object which travels ahead.

Occurrence of deadlock or a collision in this manner will be expressed as conflict (or interference) between mobile objects. However, the conflict is not limited to this example. For example, the conflict may be arrival of two mobile objects at an intersection portion (junction portion) at the same time.

The travel planning system 1 in FIG. 1 realizes efficient operation of the respective mobile objects without causing conflict (such as a collision or deadlock) among the respective mobile objects.

The travel planning device 100 in FIG. 1 includes a traveling network structure storage 101, a route plan storage 102, a travel plan storage 103, a state storage 104, a travel timing scheduler (scheduler) 105, an update position determiner 106, a commander (controller) 107, a replan determiner 108, a route planner 109, a search log storage 111, a model storage 112, a model generator 113, an evaluation value calculator 114, and a communicator 110. An input device (for example, a mouse, a keyboard or a touch panel) for a user of the present device 100 to input various kinds of instructions or data may be provided. Further, a display device (for example, a liquid crystal display or an organic electroluminescence display) which displays data within each storage or data generated at each part may be provided in the device 100.

The communicator 110 of the travel planning device 100 performs communication with a communicator 201 of the travel management device 200. Communication between the communicator 110 and the communicator 201 may be wireless communication or wired communication. The communicator 201 of the travel management device 200 performs communication with the communicator 110 of the travel planning device 100 and the mobile object 301. Communication between the communicator 201 and the mobile object 301 is wireless communication. However, wired communication is not excluded. Part or all of the mobile objects 301 may not perform communication with the communicator 201. However, also in this case, the mobile object 301 can perform communication with the communication device 501 (which will be described later) provided on any path side. The mobile object 301 can perform communication with the communication device 501 within a communication possible range of the communication device 501. In a case where the travel planning device 100 and the travel management device 200 are the same device, the communicator 110 may be omitted.

The traveling network structure storage 101 stores information indicating a structure of the travel network (traveling network structure information) inside. The traveling network structure information can be expressed as a graph structure including, for example, a plurality of nodes and a plurality of arcs (traveling paths) connecting between the nodes.

FIGS. 4A to 4C illustrate an example of the traveling network structure information. Individual traveling paths are indicated with lines coupling between the nodes. Each circle in FIG. 4A indicates a node, a line connecting between the circles indicates an arc (traveling path). The node indicates an end portion of a traveling path, and an intersection portion of traveling paths. A portion (or an area) designated in advance in the travel network will be referred to as a designated area. A position (or an area) arbitrarily determined by the user can be set as the designated area. An arbitrary position (or an arbitrary area) such as a position where package is to be piled up or to be carried down and a waiting position can be designated as the designated area. As an example, the position includes an end portion of the traveling path leading to the intersection portion, an end portion of the traveling path not leading to the intersection portion (dead end of the traveling path). In addition, an arbitrary position of the traveling path (for example, an arbitrary position between both ends of the traveling path) may be set as the designated area. The intersection portion itself may be set as the designated area. The mobile object passes through the designated area or temporarily stays in the designated area. Examples where the mobile object temporarily stays may include temporary stop for working, temporary stop for waiting until another mobile object passes through the traveling path, stop until the next work occurs while there is no work to be done, waiting for charging, parking of an autonomous driving vehicle, or the like.

FIG. 4B indicates node IDs, X coordinate and Y coordinate as detailed information of the nodes. For example, coordinate of the node A is (X, Y)=(20, 20).

FIG. 4C indicates traveling path IDs, and IDs of nodes at both ends of the traveling paths as detailed information of the traveling paths. For example, an ID of the traveling path between the nodes A and B is 1, and the nodes at both ends of the traveling path are A and B. A distance between nodes (distance of an arc) may be included in the traveling network structure information in association with the traveling path ID. Alternatively, the distance of the arc may be calculated on the basis of positions of the nodes at the both sides.

Figures 5A, 5B, 6A, 6B:
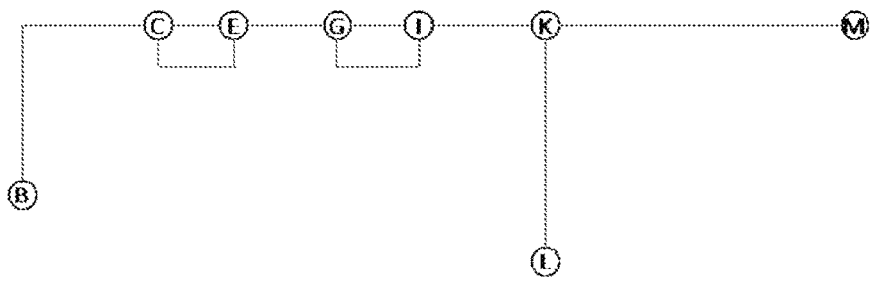
FIGS. 5A and 5B show a diagram illustrating another example of the traveling network structure information.
FIGS. 6A and 6B each are a diagram illustrating an example of a route plan.

FIGS. 5A and 5B illustrate another example of the traveling network structure information. FIG. 5A is a diagram in which part of nodes is omitted from the traveling network structure information in FIG. 4 and only specific nodes are left. The specific nodes are nodes in the designated area or near the designated area; a position where package is to be piled up or to be carried down and/or a waiting position.

FIG. 5B illustrates traveling IDs of the respective traveling paths, IDs of nodes at both ends of the traveling paths, and standard time s required for traveling on the respective traveling paths. For example, a traveling ID of the traveling path between the nodes B and C is 1, nodes at both ends of the traveling path are B and C, and a standard time required for traveling on the traveling path is 180. Any time unit may be used.

The route planner 109 generates a route plan designating passing order of a plurality of designated areas which each mobile object passes through on the basis of content of work to be done by each mobile object determined in advance and information regarding order of the work, and stores data of the generated route plan in the route plan storage 102. While an arbitrary generation method of a route plan may be employed, as an example, a route plan of each mobile object may be generated so as to reduce a traveling distance in which a plurality of mobile objects travel in reverse directions on the same traveling path, as an evaluation criterion or part of the evaluation criterion as possible. The route plan may be generated by an external device or the user. In this case, the route planner 109 receives the route plan and stores the route plan in the route plan storage 102. The route planner 109 may receive data of the route plan from the external device via the communicator 110. The route planner 109 may acquire data of the route plan via an input device operated by the user.

The route plan storage 102 stores data of the route plan of each mobile object inside.

FIG. 6A illustrates an example of the route plan of a certain mobile object. In this example, the mobile object departs from a designated area L in FIG. 4A, goes to a designated area B by way of K, I, G, E, C and A. Then, the mobile object goes to a designated area M by way of A, C, D, F, E, G, H, J, I and K, and goes to the designated area B again by way of K, I, G, E, C and A. Further, the mobile object returns to the designated area L by way of A, C, D, F, E, G, H, J, I and K. Here, for convenience sake, the designated areas are expressed using IDs of the nodes. In a case where a node corresponds to the intersection portion, a designated area using an ID of the node may be internally interpreted as expressing an end portion of a traveling path (before entering the intersection portion) connected to the intersection portion indicated by the node. For example, a designated area K which is the next designated area of the designated area L is interpreted as indicating an end portion of a traveling path LK immediately before entering the intersection portion indicated by the node K. Here, the traveling path LK is a traveling path between the node L and the node K. While the designated areas will be indicated using the node IDs also in the following description, it is assumed that the designated areas are indicated in a similar manner to that described here.

The traveling paths in the above-described example include a looped path which goes back and forth in the designated area. This route plan is directed to one mobile object, and route plans are also prepared for other respective mobile objects. Note that the traveling path does not have to be a looped path. The respective mobile objects may travel on different traveling paths over a long period.

In a case of a mobile object directed to conveyance of package, a mobile robot which does various kinds of work while moving, or the like, information of the work may be added to the route plan for the designated area in which work is to be done.

FIG. 6B illustrates an example of the route plan in this case. In this example, information (Load) which gives an instruction to do work of loading package from a shelf in the designated areas L and M and information (Unload) which gives an instruction to do work of unloading package in the designated area B are inserted. Here, Load indicates package loading work, and Unload indicates package unloading work. Note that a direction of work (piling up etc.) to be done for a shelf being working target may be determined in advance or may be automatically detected by the mobile object using a sensor, or the like. The examples of the direction of work include a left direction, a right direction, an anterior direction and an oblique direction.

The state storage 104 stores information indicating states of the respective mobile objects and specific information of the mobile objects inside.

The states of the mobile objects may include position information of the mobile objects, remaining battery levels of batteries mounted on the mobile objects, whether or not the mobile objects have package (in a case where the mobile objects convey package), types and the number of pieces of package which are being conveyed, or the like. The position information includes current positions (positions which are detected most recently) of the mobile objects, and history information of positions which the respective mobile objects have passed through until now. The information indicating the states of the mobile objects is acquired by a state detector 202 (which will be described later) of the travel management device 200 as will be described later.

The specific information of the mobile objects may include, for example, specification information of the mobile objects, such as standard speed, maximum speed, minimum speed, sizes of the mobile objects and directions in which the mobile objects can move. Further, the information may include a change rate of the standard speed in accordance with the remaining battery levels (for example, as the remaining battery level is lower, the standard speed is set lower). Still further, if the mobile objects are directed to conveyance of package, the information may include information of length of a working period required for carrying down package (for example, a length of period required for piling up or carrying down a predetermined number of pieces of package). The information described here is merely an example, and the information may include other information.

The travel timing scheduler 105 generates a travel schedule (which may be called a travel timing schedule) so that conflict (a collision or deadlock) does not occur for a plurality of mobile objects which each are a planning target under constraint conditions that the route plan of each mobile object is not changed. The travel timing schedule is a schedule which determines timings of departure/arrival and passing of respective designated areas by the mobile objects for a plurality of mobile objects. The travel timing schedule includes a plurality of designated areas which the plurality of mobile objects depart from/arrive at and pass through, and time at which the plurality of mobile objects arrive at each designated area or time at which the plurality of mobile objects depart from each designated area. The travel schedule is an aggregate of individual travel schedules (individual travel schedules) of the plurality of mobile objects. The individual travel schedules include a plurality of designated areas which the mobile objects depart from/arrive at and pass through, and time at which the mobile objects arrive at each designated area or time at which the mobile objects depart from each designated area as an example. The travel timing schedule may include information such as a length of a period during which each mobile object stays in the designated area and a length of a period during which each mobile object moves among designated areas.

The mobile objects for which the travel timing schedules are to be generated are all mobile objects whose operation is managed by the travel management device 200 as an example. The travel timing scheduler 105 uses the route plans of the plurality of mobile objects and information (information indicating states and specific information) of the plurality of mobile objects to generate the travel timing schedules.

The travel timing scheduler 105 generates the travel timing schedule upon generation of an initial schedule or in a case where it is determined to perform replan by the replan determiner 108. Update of the travel timing schedule is performed on a route portion after the update position determined for the mobile object as will be described later.

FIG. 7 illustrates an example of the travel timing schedule generated by the travel timing scheduler 105. An example of the travel timing schedule for three mobile objects (AGV 0, AGV 1, AGV 2) is indicated. The travel timing schedule includes an individual travel schedule for the AGV 0, an individual travel schedule for AGV 1, and an individual travel schedule for AGV 2.

"MOVE" is a command (move command) for giving an instruction to move, and has a movement period length as an argument. For example, in the travel timing schedule for the AGV 0, MOVE-K-I-37.0 indicates movement from the designated area K (end portion of the traveling path LK leading to the intersection portion indicated by the node K) to the designated area I (end portion of the traveling path KI leading to the intersection portion indicated by the node I) in 37 time units. 37 time units is a movement period length designated as an argument.

"WAIT" is a command (wait command) for giving an instruction to wait in the designated area (before the node) of the movement destination. For example, in a case where a command of MOVE-I-G-10.0 is continuous with a command of WAIT-52.0, the commands indicate waiting for 52 time units in the designated area G (before the node G) when the mobile object moves from the designated area I to the designated area G. Therefore, in this case, the mobile object moves to the designated area G in 10 time units with MOVE-I-G-10.0, waits for 52 time units and moves in accordance with the next command (enters the intersection portion indicated by the node G and further enters the next traveling path). The waiting position may not be a designated area. The waiting position only has to be a position distant from the intersection portion.

In the present example, in the route plan of the mobile object AGV 0, a route (traveling paths) is designated in which the mobile object departs from the designated area L in FIG. 4A, goes to the designated area B by way of other designated areas, and, then, goes to M by way of other designated areas, goes to B again by way of other designated areas and returns to L by way of other designated areas.

In the route plan of the mobile object AGV 1, a route (traveling paths) is designated in which the mobile object repeats twice departing from the designated area B in FIG. 4A, going to the designated area M by way of other designated areas, and returning to the designated area B again by way of other designated areas.

In the route plan of the mobile object AGV 2, a route (traveling paths) is designated in which the mobile object departs from the designated area K in FIG. 4A, goes to the designated area B by way of other designated areas, goes to B again by way of other designated areas including the designated area L and returns to the designated area K by way of other designated areas.

The travel timing scheduler 105 generates the travel timing schedule including the individual traveling schedules for AGV 0, AGV 1 and AGV 2 illustrated in FIG. 7 by executing search algorithm which will be described later under conditions where these route plans (see FIGS. 6A and 6B) of AGV 0, AGV 1 and AGV 2 are provided. The travel timing schedule includes time adjustment of, for example, causing the mobile object to wait before the intersection portion until another mobile object passes through the intersection portion, to thereby adjust arrival time, departure time, or the like, of AGV 0, AGV 1 and AGV 2 at each designated area. By this means, occurrence of conflict (such as a collision or deadlock) is prevented.

The travel timing scheduler 105 may assume that the mobile objects move at the standard speed for each traveling path in the traveling network structure information in FIG. 4 in order to calculate a movement period length designated as the argument in the MOVE command. A standard period length for the traveling path may be provided in advance as in the traveling network structure information in FIG. 5 in view of a case where speed of the mobile object changes from the standard speed in accordance with a curvature, inclination, or the like, of the traveling path. In this case, the mobile objects may autonomously control movement speed between maximum speed and minimum speed so as to be able to move in the standard period. Further, there can be a case where the standard speed may be corrected by change rates provided in accordance with the remaining battery levels. Still further, if the mobile objects are directed to conveyance of package, the standard speed may be corrected to faster or slower while the mobile objects convey package. Further, the standard period length during which the mobile objects travel on each traveling path may be corrected on the basis of traveling result data. The travel timing scheduler 105 calculates a movement period length so as to satisfy conditions regarding speed as stated in the above.

The travel timing scheduler 105 generates traveling timing schedules while reflecting information of a working period length required for carrying down package for mobile objects which are directed to conveyance of package or mobile robots which do various kinds of work including carrying down of package. As indicated in the above-described route plan (see FIG. 6B), content of work to be done in the designated area may be designated. Further, content of work to be done by the mobile objects in the designated area may be determined in advance in accordance with pairs of the designated areas and types of mobile objects.

In the example of the traveling timing schedules illustrated in FIG. 7, it is assumed that it takes 40 time units to pile up package in the designated areas M and L, and it takes 130 time units to carry down package in the designated area B. Values depending on types and the number of pieces of package, or types of mobile objects are provided in advance as working period lengths for piling up and carrying down of package. These values may be stored in the state storage 104 or may be provided to the route plans. Further, the working period lengths may be corrected on the basis of the traveling result data. A command which instructs the mobile object to do work may be associated with a designated area where the work is to be done. The command which instructs the mobile object may be embedded in advance inside a program code which is to be executed by the mobile object.

While a format of the travel timing schedule illustrated in FIG. 7 is a format in which commands for the mobile objects are lined up, the format is merely an example. The format of the travel timing schedule is not particularly limited. The travel timing schedules only have to include a format from which time at which the mobile object should arrive and time at which the mobile objects should depart can be specified for part of designated areas or all the designated areas in the route plans of the respect mobile objects.

The travel timing scheduler 105 generates a travel plan of each mobile object on the basis of the travel timing schedule and the route plan of each mobile object. In the travel plan of each mobile object, information for specifying time at which the mobile object should arrive at and time at which the mobile object should depart from for part or all of the designated areas in the route plan of the mobile object, is set.

The travel plan storage 103 stores the travel plan of each mobile object inside.

FIG. 8 illustrates part of the travel plan of the mobile object (AGV 0) in FIG. 7. Time information of the AGV 0 in FIG. 7 is provided to the route plan in FIGS. 6A and 6B. The AGV 0 departs from a designated area L at time 0, arrives at a designated area K at time 70, departs without stopping (that is, passes through the designated area K at time 70), passes through a designated area I at time 107, arrives at a designated area G at time 117, waits there for 52 time units and departs at time 169. The format of the travel plan illustrated in FIG. 8 is merely an example, and the format is not particularly limited. For example, the travel plan may be a plan in which a plan portion of the AGV 0 (individual travel schedule of the AGV 0) in the travel timing schedule is merely associated with the route plan of the AGV 0.

The commander (controller) 107 transmits the movement command data of each mobile object based on the travel timing schedule to the travel management device 200 via the communicator 110. The travel management device 200 receives the movement command data of each mobile object from the communicator 110 of the travel planning device 100 via the communicator 201. The travel management device 200 transmits the movement command data of each mobile object to each mobile object via the communicator 201. In this manner, the commander 107 controls traveling of each mobile object by transmitting the movement command data of each mobile object.

A first example of a form of the movement command data is a form which indicates information from which arrival time and departure time for part or all of the designated areas on the route plan of each mobile object can be specified. For example, in a case of the travel timing schedule in FIG. 7, because the schedule itself is a command sequence, this may be used as is as the movement command data. Alternatively, in a case where the travel timing schedule having a format different from that in FIG. 7 is generated, it is also possible to generate a command sequence which can be interpreted by each mobile object from the travel timing schedule and transmit this command sequence to each mobile object as the movement command data.

A second example of the form of the movement command data is a form which indicates a movement period length on each traveling path and a waiting period length in each designated area.

In either of the above-described two examples, each mobile object controls traveling by itself in accordance with the movement command data. The travel management device 200 may sequentially repeat to transmit a command which instructs each mobile object to depart from the designated area in which the mobile object waits, and a command which designates the designated area in which the mobile object should stop for waiting next, to each mobile object. In this case, each mobile object sequentially repeats reception of commands from the travel management device 200 as the movement command data and execution of the commands.

As a third example of the form of the movement command data, an intersection portion through which a plurality of mobile objects pass on route plans may be specified from the travel timing schedules, and designate order in which the plurality of mobile objects pass through the intersection portion may be instructed to the plurality of mobile objects. In this case, the intersection portion may be set as the designated area, and order in which the plurality of mobile objects pass through the designated area may be designated. By causing a plurality of mobile objects to strictly meet the passing order, even if actual arrival time is shifted before and behind from the arrival time in the travel timing schedule, it is possible to prevent occurrence of conflict such as a collision or deadlock. Note that the passing order of the plurality of mobile objects for the designated area can be calculated on the basis of the travel timing schedules.

An example of commands which instruct order in which the respective mobile objects pass through (arrive at) the designated area (described as the designated area Ka) set at the intersection portion of the node K and time (elapsed time length), to be issued to the AGV 0, AGV 1 and AGV 2 will be described below on the basis of the travel timing schedules in FIG. 7.

AGV 2 0
AGV 0 70
AGV 1 205
AGV 1 453
AGV 2 593
AGV 2 773
AGV 0 920
AGV 0 1168
AGV 1 1218
AGV 1 1466
AGV 2 1606
AGV 0 1925

The AGV 2 passes through the designated area Ka first (at a time point of time 0), then, the AGV 0 passes at a time point of time 70, and then, the AGV 1 passes at a time point of time 205. Interpretation will be possible in a similar manner in the following description.

As an example of a method for controlling the passing order of the designated areas includes a method in which the travel management device 200 manages execution of the movement commands. The travel management device 200 manages execution of the movement command data (execution of the command). For example, the travel management device 200 causes the AGV 0 to wait at a position before the designated area or distant from the designated area until the AGV 2 passes in a case where the AGV 0 may first arrive at the designated area through which the AGV 2 is required to pass first. Alternatively, the travel management device 200 adjusts speed of the AGV 0 to delay arrival time (passing time) of the AGV 0 at the designated area. The control is performed by a wait command or a speed adjustment command (for example, a speed reduction command) being transmitted to the mobile object.

As another example of the control method, the travel management device 200 detects and stores identification information (ID) of the mobile object which passes through the designated area last via the state detector 202, and transmits the ID to other mobile objects. Other mobile object checks whether another mobile object which should pass before the mobile object has passed through the designated area on the basis of the ID received from the travel management device 200. For example, in a case of

AGV 0 70
AGV 1 205
AGV 1 453 in the above-described example of the command, the AGV 1 first confirms whether or not the AGV 0 has passed first before the AGV 1 passes through the designated area Ka on the basis of the ID received from the travel management device 200. After the AGV 1 has confirmed that the AGV 0 has passed first, the AGV 1 passes through the designated area Ka. Thereafter, after the AGV 1 confirms that the mobile object which has passed through the designated area Ka immediately before (last) is the AGV 1 itself, AGV 1 passes through the designated area Ka again.

The replan determiner 108 compares the travel plan stored in the travel plan storage 103 with the state of the mobile object detected by the state detector 202, and determines whether or not to perform replan. Replan means update of the travel plan, that is, update of at least travel timing schedule among the route plan and the travel timing schedule. Update of the travel timing schedule means update of at least one of individual travel schedules of the plurality of mobile objects. In a case where it is judged by the replan determiner 108 that the travel plan cannot be met by at least one mobile object, a replan trigger is generated. Further, also in a case where replan becomes necessary by external factors such as occurrence of new work and new package to be conveyed, a replan trigger is generated. As an example, all the mobile objects for which plans are to be made become targets of the replan. As a result of replan, there can be a mobile object for which the individual travel schedule is not changed. Examples where the travel plan cannot be met will be described below as a first example and a second example.

(First example) Time (estimated arrival time) at which each mobile object arrives at the designated area in the travel timing schedule or time (estimated departure time) at which each mobile object departs is compared with the state of each mobile object. The traveling state includes, for example, a current position of the mobile object and a designated area through which the mobile object passes last or from which the mobile object departs last. Then, at a time point at which it is determined that the mobile object cannot arrive by the estimated arrival time or the mobile object will be delayed by equal to or longer than a threshold time length for the estimated arrival time, the replan trigger is generated. To make this judgment, various kinds of assumption may be placed such as assumption that the mobile object moves on the traveling path at maximum possible speed or assumption that the mobile object moves at standard speed.

(Second example) Order in which the respective mobile objects pass through the designated area in the traveling timing schedules is compared with current positions of the respective mobile objects. Or, the order is compared with a designated area through which the mobile object has passed last or from which the mobile object departs. Then, at a time point at which it is determined that the mobile object which should precede in the designated area where the passing order is defined will be delayed by equal to or longer than a threshold time length from estimated arrival time, the replan trigger is generated. For example, in a case where the mobile object which should precede will be late for the estimated arrival time even if the mobile object moves on the traveling path at maximum speed, it is judged that delay by equal to or longer than a threshold time length is determined.

The update position determiner 106 determines a timing at which the travel plan should be updated for each mobile object in a case where it is determined by the replan determiner 108 to perform replan. In the present embodiment, the travel plan of the mobile object is updated in accordance with a timing at which the mobile object arrives at the update position. Therefore, the update position determiner 106 determines the update position of each mobile object. The mobile object operates in accordance with the travel plan before update (travel timing schedule before update) until the mobile object reaches the update position, and, after the mobile object reaches the update position, the mobile object operates in accordance with the updated travel plan (updated travel timing schedule). A timing for updating the travel plan is not limited to an example where the timing is specified by the update position, and may be designated by, for example, time.

As an example of the update position, in a case where each mobile object can perform communication with the travel management device 200 in real time, the update position may be an arbitrary position (such as, for example, a current position of the mobile object, or a position at time after a certain margin is added to the current position in view of a time length required for calculation).

If the mobile object can perform communication with the travel management device 200 only via the communication device 501 disposed in the designated area or near the designated area, the designated area or a position near the designated area is set as the update position. The communication device 501 may be disposed in midstream of the traveling path instead of being disposed in the designated area or near the designated area. The update position may be provided at any position if the position is within a range where communication with the communication device 501 is possible. In a case where there is a possibility that the mobile object may hinder traveling of another mobile object by stopping in midstream of traveling (for example, a possibility that the mobile object may collide with a mobile object which comes from behind), a designated area to which the mobile object currently heads or a position before the designated area may be as the update position.

The route planner 109 generates a route plan starting from the update position of each mobile object for each mobile object in a case where it is determined by the replan determiner 108 to perform replan.

As an example, a plan for a route portion after the update position in the current route plan is set as is as the updated route plan. That is, a route plan portion on which the mobile object has not moved yet, among the route indicated in the route plan of the mobile object, is set as the updated route plan. It is, for example, assumed that, in a case where the current route plan is the route plan in FIG. 6A, the current position of the mobile object is a designated area E (before the intersection portion indicated by the node E), and the next movement destination is a node C (before the intersection portion indicated by the node C). In this case, a route plan portion (updated route plan) through which the mobile object has not passed yet becomes as follows by removing first four nodes L, K, I and G in FIG. 6A. (Updated route plan)

E, C, A, B, A, C, D, F, E, G, H, 3, I, K, M, K, I, G, E, C, A, B, A, C, D, F, E, G, H, J, I, K, L, K, I, G, E,

Alternatively, as another example, in a case where it is determined by the replan determiner 108 to perform replan, the route planner 109 may generate the route plan of each mobile object so as to reduce a sum of distances of the traveling paths (traveling sections) on which a plurality of mobile objects travel in reverse directions at the same time where the sum of distances is used as an evaluation criterion or part of the evaluation criterion.

Alternatively, in a case where a plurality of options for the route plan which can be utilized are provided in advance in accordance with a current position of the mobile object and content of work to be done by the mobile object, one of the options may be selected from the plurality of options on the basis of the update position of the mobile object and content of the remaining work. In addition, there is also a method in which a new route plan is generated using algorithm provided in advance. The update method of the route plan is not particularly limited, and existing route planning methods may be used.

The travel timing scheduler 105 regenerates (updates) the travel timing schedule on the basis of the updated route plan. The travel timing scheduler 105 generates a plurality of tentative travel schedules (below, tentative travel timing schedules) in which timings are partially updated, and part of conflict in earlier time in the schedule is solved. The evaluation value of each tentative travel timing schedule based on delay times of a plurality of mobile objects is acquired using the evaluation value calculator 114. Search processing of repeating selection of the tentative travel timing schedule based on the acquired evaluation value and generation of a new tentative travel timing schedule obtained by changing a portion of the selected tentative travel timing schedule after a range in which conflict has been solved, is performed. As an example, the evaluation value calculator 114 sets a value obtained by summing up sums for a plurality of mobile objects of delay times occurring at an update completion portion of the travel timing schedule and predicted values of delay times occurring after the travel timing schedule is updated with the tentative travel timing schedule as an evaluation value. In this case, as an example, the tentative travel timing for which the evaluation value is a minimum or equal to or less than a threshold is selected.

The calculation example of the evaluation value is an example, and is not limited to this method.

As the predicted value of the delay time, the delay time may be calculated assuming that delay may occur at fixed weight in accordance with a traveling distance while it is assumed that the mobile object travels while conflict among mobile objects is ignored, or the delay time may be calculated in view of gradient, or the like, of the route. In place of the sum, a sum of exponents may be used. The travel timing scheduler 105 updates the travel timing schedule with the searched tentative travel timing schedule.

The evaluation value calculator 114 calculates the evaluation value (for example, a delay time) from the schedule within a range in which conflict in the tentative travel timing schedule has been solved as a method for calculating the evaluation value. Concerning a range after the range in which conflict has been solved, there is a method in which the evaluation value is calculated using an evaluation function defined in advance and a method in which the evaluation value is calculated (that is, predicted) from state features of a plurality of mobile objects in the tentative timing schedule using a model generated from data by the model generator 113. The respective methods will be described in detail later.

The travel timing scheduler 105 acquires a search log which is data required for generating a model for each tentative travel timing schedule in the above-described search processing, and stores the acquired search log in the search log storage 111. The search log is data (first data) including state features of a plurality of mobile objects in each tentative travel timing schedule, and a result value of an evaluation value of a portion after the range described above in which conflict has been solved in the tentative travel timing schedule.

FIG. 9 illustrates an example of the search log. One row corresponds to one search log. The search log includes current positions and remaining traveling distances of the mobile objects 1 to 4 as the state features of the plurality of mobile objects. The state features of the mobile objects are features indicating traveling states of the mobile objects.

The mobile objects 1 to 4 do not have to be mobile objects having specific IDs, and it is only necessary that IDs are associated with the mobile objects in the same travel timing schedule. If different four mobile objects are targets of the travel timing schedule in the past different travel timing schedule, the four mobile objects respectively correspond to the mobile objects 1 to 4.

The state features of the mobile objects may include information regarding a package. Examples of the information regarding a package can include, for example, whether or not the mobile objects have a package, the number of packages, and a total number of packages which have not been conveyed.

The current position may be a coordinate at which the mobile object is located, an ID of the designated area in which the mobile object is located, or an ID of the traveling path on which the mobile object is located. Further, the current position may be identification information of an area when the mobile object travel network is divided into a plurality of areas. The identification information of the area will be described using FIG. 10.

Figure 10:
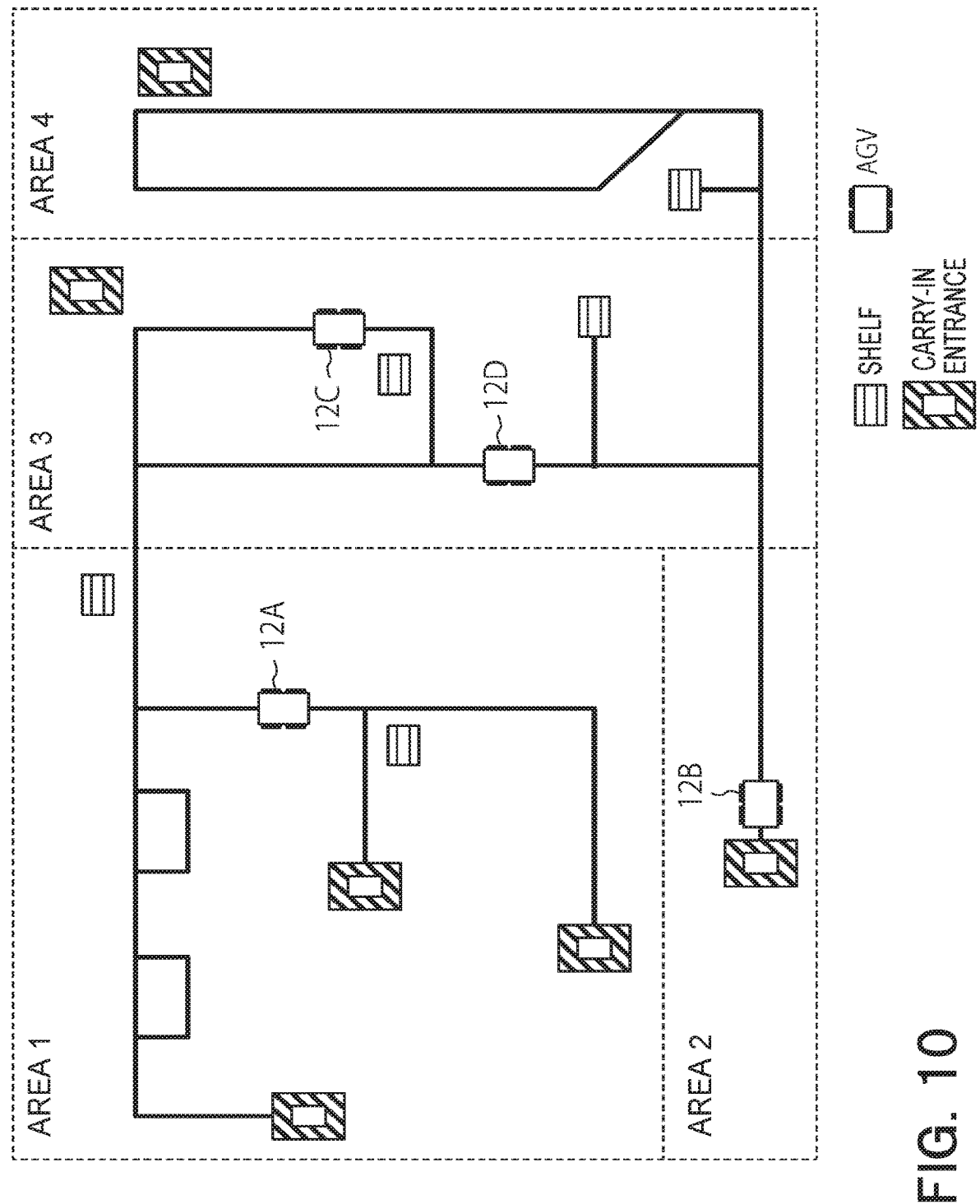
FIG. 10 is a diagram illustrating an example of feature amounts of positions.

FIG. 10 illustrates an example where the travel network is divided into four areas of areas 1 to 4 in a similar manner to FIG. 2. Areas 1 to 4 in FIG. 9 correspond to the areas 1 to 4 in FIG. 10.

The remaining traveling distance is a traveling distance left from the current position in the route plan (estimated position after each mobile object travels in a range in which conflict in the tentative travel timing schedule has been solved).

Further, the search log includes the calculated evaluation value and a search depth. In the search processing, detection of conflict among mobile objects in a case where each mobile object travels as planed from an initial state (the travel timing schedule before update), creation of the tentative travel timing schedule which solves conflict every time the conflict is detected, and detection of conflict among mobile objects in the created tentative travel timing schedule, are performed. Then, hereinafter, creation of the tentative travel timing schedule which solves conflict, and detection of conflict among mobile objects in the created tentative travel timing schedule are repeatedly performed (search processing).

A search tree in which states branch in a depth direction from an initial state as creation of the tentative travel timing schedule proceeds can be obtained. A search depth corresponds to a depth (hierarchy) of search from the initial state of the search tree (see FIG. 15 which will be described later), and, specifically, corresponds to the number of times conflict is solved.

As the evaluation value in the search log, a result value of a portion which is predicted during search, and which is determined after the search is completed is recorded. For example, a delay time (a sum of adjusted times for solving conflict) in traveling from the current position of the mobile object in midstream of the completed travel timing schedule (estimated position after each mobile object travels in a range in which conflict in the tentative travel timing schedule has been solved) until the end of the travel timing schedule, is calculated, and a value obtained by summing up the delay times for the plurality of mobile objects is used.

In a case where the search is performed to the end, a remaining traveling distance of the search log becomes zero. There is also a case where search is finished in midstream due to time restriction, or the like. Note that, in the search log storage 111, search logs acquired in a plurality of travel timing schedules which have been executed in the past may be accumulated.

As a result of the search processing, the tentative travel timing schedule for which evaluation is the highest is selected. There is a case where evaluation is higher as a value of the evaluation value is greater, or a case where evaluation is higher as the value of the evaluation value is smaller, depending on definition of the evaluation value. While, in an example in FIG. 10, evaluation is higher as the value of the evaluation value is smaller, the evaluation value may be defined so that evaluation becomes higher as the value of the evaluation value is greater. A tentative travel timing schedule for which evaluation is the highest among the tentative travel timing schedules for which calculation has been performed is selected. In a case where there exist a plurality of tentative travel timing schedules for which the evaluation value is a minimum, a tentative travel timing schedule in which a search depth is the shallowest may be selected. As the search depth is shallower, the number of times conflict is solved is smaller. Further, it is also possible to select a tentative travel timing schedule on the basis of both the evaluation value and the search depth.

The search log storage 111 stores an evaluation value of each tentative travel timing schedule corresponding to each state in midstream of the search tree in association with the state features of the plurality of mobile objects in each state and a search depth of each state when the search processing by the travel timing scheduler 105 is finished or in parallel to the search processing.

The model generator 113 generates or updates a model in which the state features of the plurality of mobile objects are associated with evaluation values on the basis of data of sets of the state features of the plurality of mobile objects and the evaluation values stored in the search log storage 111. The model is a function, a program, or the like, to which the state features of the plurality of mobile objects are input, and from which the evaluation value is output.

For example, the model may be a model which searches for the search log which is similar to the provided state features of the plurality of mobile objects from the search log storage 111 and outputs the evaluation value included in the found search log.

This method is called a neighborhood method. A search depth may be provided as input as well as the state features of the plurality of mobile objects. Further, as another example of the model, the model may be a so-called neural network model, or a model generated through machine learning such as a decision tree. For example, if the model is a neural network, a parameter of the neural network is generated or updated.

The evaluation value calculator 114 calculates (predicts) the evaluation value from the state features of the plurality of mobile objects provided from the travel timing scheduler 105 on the basis of the model generated by the model generator 113. By this means, the travel timing scheduler 105 can acquire the evaluation values of the tentative travel timing schedules which are successively generated in the search processing with high accuracy.

The travel timing scheduler 105 acquires time information of each designated area on the basis of the travel timing schedule updated with the selected tentative travel timing schedule and provides the acquired time information of each designated area to the updated route plan. By this means, a travel plan of each mobile object is regenerated. The travel timing scheduler 105 updates the travel plan storage 103 with the regenerated travel plan.

The commander (controller) 107 generates movement command data for each mobile object on the basis of the updated travel timing schedule, and transmits the movement command data for each mobile object to the travel management device 200. The travel management device 200 transmits the movement command data to each mobile object when each mobile object exists at the update position.

The travel management device 200 manages execution for causing each mobile object to travel and manages the state of each mobile object in accordance with the movement command data of each mobile object received from the travel planning device 100.

The communicator 201 of the travel management device 200 performs communication with the mobile objects 301_1 to 301_N and the travel planning device 100. Communication may be either wireless communication or wired communication.

The state detector 202 of the travel management device 200 acquires information indicating the state of the mobile object using the communication device 501 or the sensor 401. The state detector 202 may acquire information indicating the state of the mobile object using the communicator 201. The state detector 202 transmits information indicating the state of each mobile object to the travel planning device 100 via the communicator 201. The information indicating the state of each mobile object may include time at which the state of each mobile object is detected.

The sensor 401 is a sensor for detecting a state of the mobile object. The communication device 501 is a device which performs wireless communication with the mobile object in a shorter distance than of wireless communication performed by the communicator 201. The sensor 401 and the communication device 501 are disposed at, for example, specific positions on any traveling paths where the mobile object is likely to temporarily stop. The specific positions are designated areas or portions near the designated areas as an example.

The sensor 401 is a traveling path side sensor such as a proximity sensor, a pressure sensor and a photoelectric sensor as an example. The sensor 401 detects arrival of the mobile object, passing, a direction, whether or not package is loaded, or the like, at the specific positions. The sensor 401 may be a camera provided on a ceiling of a facility. In this case, an image inside the facility is captured with the camera from a higher point of view from the ceiling. The communication device 501 is a device which performs communication in a relatively short distance such as, for example, near field communication and infrared communication. The communication device 501 can perform wireless communication with the mobile object existing within a communication range.

The sensor 401 transmits a signal indicating information detected from the mobile object to the state detector 202. The communication device 501 transmits the information received from the mobile object to the state detector 202.

The state detector 202 specifies the state of the mobile object on the basis of the information received from the sensor 401 or the communication device 501. In a case where the sensor 401 is a camera, the state detector 202 specifies a position of each mobile object on the basis of the captured image. By using the sensor 401 or the communication device 501, it is possible to detect the state of the mobile object even when the mobile object exists at a position where the mobile object cannot perform communication with the communicator 201.

Examples of the state of the mobile object include a position of each mobile object (current position), time at which each mobile object passes through the designated area, a traveling direction of each mobile object, whether or not each mobile object has package (in a case where each mobile object conveys package), or the like.

In a case where the mobile object has a function of performing self-position estimation at the own device, the state detector 202 may acquire the position information estimated by the mobile object via the communicator 201 or the communication device 501. Examples of the self-position estimation may include estimation using means such as dead reckoning, SLAM and GPS.

Further, markers for position detection such as wireless tags and barcodes may be provided at positions where the mobile objects are likely to pass. The positions are designated areas or positions near the designated areas as an example. In this case, by the mobile objects detecting the markers, the mobile objects themselves can detect arrival at or passing through the positions. The mobile objects transmit the detected information to the travel management device 200 via the communicator 201 or the communication device 501.

Each mobile object 301 receives the movement command data from the travel management device 200 and autonomously travels on the traveling paths in accordance with the movement command data. As means for autonomous traveling, for example, as illustrated in FIG. 2 described above, there is means in which guide tapes are pasted on floor in advance, and the mobile objects travel along the guide tapes. As another means, there is means in which traveling in a certain distance is repeated using dead reckoning while positions are corrected with markers, or means in which the mobile objects autonomously travel between designated areas using SLAM (Simultaneous Localization And Mapping), or the like.

Figure 11:
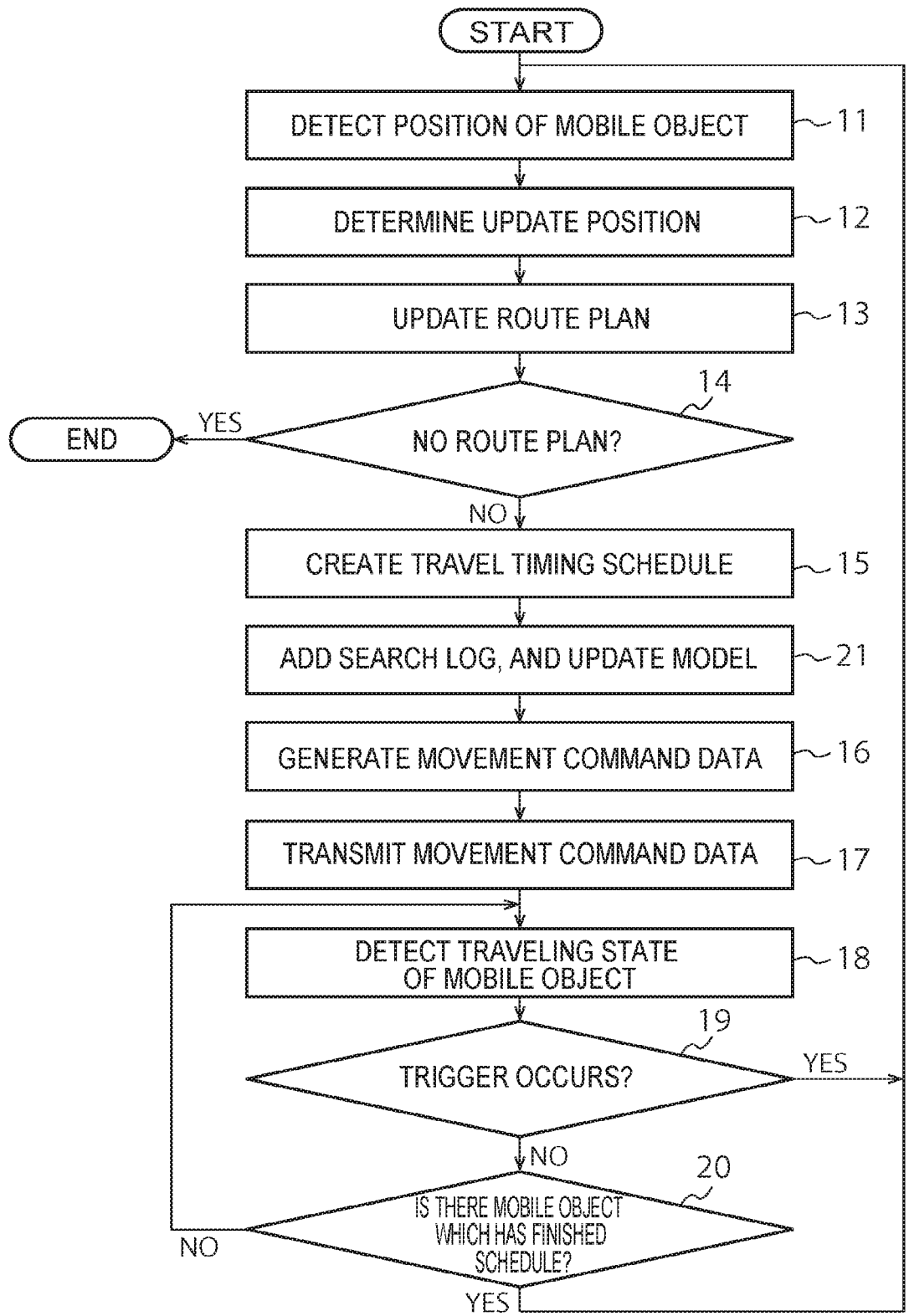
FIG. 11 is a flowchart of processing of the travel planning system.

FIG. 11 is a flowchart of overall operation of the travel planning system 1. It is assumed that the route plan of each mobile object is provided in advance, the travel timing schedule is generated by the travel timing scheduler 105, and the travel plan in which the time information of the travel timing schedule is provided to the route plan is generated. It is assumed that each mobile object operates on the basis of the movement command data based on the travel timing schedule. Note that supplementary explanation of operation upon start of operation of the travel planning system 1 (the travel timing schedule has not been created yet, and each mobile object stops at an initial position) will be provided as appropriate.

In the processing illustrated in FIG. 11, the travel timing scheduler 105 generates or updates the model using the search log added to the search log storage 111 every time the travel timing schedule is updated. It is assumed in the present example that evaluation is higher as the value of the evaluation value is greater. For example, an inverse of a sum of the delay times described above is set as the evaluation value.

The state detector 202 of the travel management device 200 detects a position and a traveling direction of each mobile object (step 11). Note that, upon start of operation of the travel planning system 1, it is only necessary to detect an initial position and a direction of each mobile object. Note that, in a case of a mobile object which can turn at the place and can move in all directions, there can be a case where a traveling direction is not detected.

The update position determiner 106 determines an update position at which the travel plan of each mobile object is updated on the basis of a current travel plan of each mobile object (step 12). Note that, upon start of operation of the travel planning system 1, because the travel plan of each mobile object has not been generated yet, it is only necessary to set an initial position of each mobile object as the update position.

The route planner 109 generates the route plan starting from the update position for each mobile object or extracts part of the route plan prepared in advance. The previous route plan is updated with the generated or extracted route plan (step 13). Note that, upon start of operation of the travel planning system 1, it is only necessary to generate the route plan starting from the initial position of each mobile object or acquire the route plan from outside.

In a case where the route plans are not generated for all the mobile objects (step 14: Yes), processing of the present flowchart is finished. For example, in a case where there is no package to be transported, no work to be done, or the like, the route plan is not generated for the mobile object. The present processing may be finished if update of the travel timing schedule does not finish in time (for example, there is a possibility that current operation of all the mobile objects will finish before the travel timing schedule is updated). Alternatively, the present processing may be finished also in a case where it is determined that the route plan cannot be generated.

In a case where the route plan is updated (regenerated) for at least one mobile object (step 14: No), the travel timing scheduler 105 generates or updates the travel timing schedule by performing search processing on the basis of the updated route plan of the mobile object (step 15). After processing of generating or updating the travel timing schedule is completed, a search log in which a result value (for example, a delay time) of the evaluation value in a portion predicted during search is associated with the state features of the plurality of mobile objects and the search depth on the basis of a result of the search processing is added to the search log storage 111 (step 21). Calculation of the evaluation value is performed using an evaluation function defined in advance before the model which will be described later is generated. The travel timing scheduler 105 generates the travel plan by providing the time information indicated in the travel timing schedule to the route plan. Note that it is only necessary that a mobile object for which the route plan has not been generated (for example, a mobile object whose operation has been completed) is set as an exception for the travel timing schedule.

The model generator 113 generates or updates the model on the basis of the search log stored in the search log storage 111 (step 21). When a model does not exist yet in the model storage 112, the model generator 113 generates a model, while, when a model has already existed, the model generator 113 updates the model. Accuracy of the model is calculated using the model and the search log. For example, an evaluation value is calculated (predicted) with the model using the state features of the plurality of mobile objects in the search log as input. A difference between the predicted evaluation value and the evaluation value included in the search log is calculated. If an average value of the difference is equal to or greater than a threshold, it is judged that accuracy of the model is high, while, if the average value is less than the threshold, it is judged that accuracy is low. In a case where it is judged that accuracy is high, in the next and subsequent step 15, the evaluation value is calculated (predicted) using the model without using the evaluation function defined in advance. In this case, step 21 is omitted.

Note that even after the model is generated, the evaluation value may be regularly calculated with the evaluation function defined in advance in step 15, the search log may be added to the search log storage 111 in step 21, and the model may be updated.

The commander 107 generates the movement command data for each mobile object on the basis of the travel timing schedule of each mobile object (step 16) and transmits the movement command data of each mobile object to the travel management device 200.

The travel management device 200 transmits the movement command data to each mobile object using the communicator 201 (step 17).

The state detector 202 of the travel management device 200 monitors the state of each mobile object in real time via at least one of the communicator 201, the sensor 401 and the communication device 501 (step 18). The state detector 202 transmits information indicating the state of each mobile object to the replan determiner 108 via the communicator 201 (also step 18).

The replan determiner 108 judges whether at least one mobile object which cannot meet the travel plan (or the travel timing schedule) exists on the basis of the travel plan of each mobile object and the state of each mobile object (step 19). Alternatively, the replan determiner 108 judges whether or not it becomes necessary to perform replan due to external factors such as occurrence of new work (step 19). The replan determiner 108 generates a replan trigger in a case where it is determined to perform replan (step 19: Yes).

In a case where the replan trigger is generated (step 19: Yes), the processing returns to step 11. Then, the route plans and the travel timing schedules of all the mobile objects (except mobile objects for which execution of plans has already been finished) are updated (step 11 to step 15). Then, the movement command data based on the updated travel timing schedules is transmitted to the respective mobile objects again. Note that each mobile object updates the movement command data which has been previously received with the received movement command data.

In a case where the replan trigger is not generated (step 19: No), it is judged whether a mobile object which has finished the travel plan (or the travel timing schedule) exists. In a case where a mobile object which has finished the travel plan exists (step 20: Yes), the processing returns to step 11. In a case where a mobile object which has finished the travel plan does not exist (step 20: No), the processing returns to step 18. The processing from step 18 to step 20 is repeated until the replan trigger is generated or until a mobile object which has finished the travel plan occurs.

Details of step 15 in FIG. 11 will be described using FIG. 12, FIGS. 13A to 13C and FIGS. 14A to 14D. In the present step, the travel timing schedule is generated which ensures that a collision or deadlock among mobile object does not occur even in a case where a plurality of mobile objects which travel in reverse directions or travel at different speed on the same traveling path in the respective route plans exist. In generation of the travel timing schedules, preconditions are set such that the route plans of the respective mobile objects are not changed.

Figure 12:
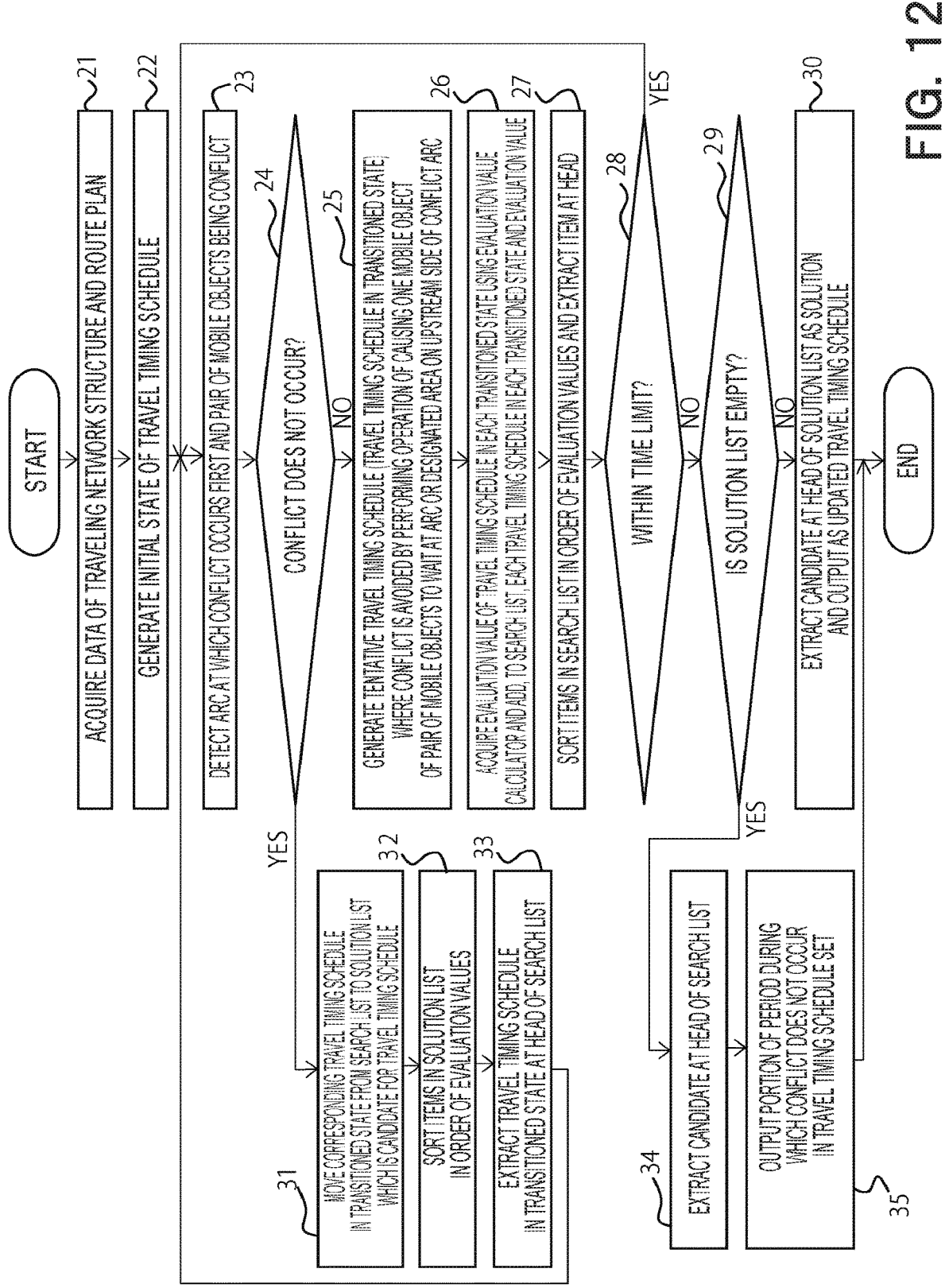
FIG. 12 is a flowchart of detailed processing of a travel timing scheduler.

FIG. 12 is a flowchart of an example of the processing by the travel timing scheduler 105. It is assumed in the present example that evaluation is higher as the value of the evaluation value is greater. For example, an inverse of a sum of the delay times described above is set as the evaluation value.

The travel timing scheduler 105 acquires the traveling network structure information (see FIGS. 4A to 4C or FIGS. 5A and 5B) from the traveling network structure storage 101 and acquires data of the route plans from the route plan storage 102 (step 21).

The travel timing scheduler 105 generates an individual travel schedule at which at least one of time at which each mobile object arrives at each designated area and time at which each mobile object departs from each designated area is specified on the basis of the traveling network structure information and the route plan of each mobile object as an example (step 22). The individual travel schedules in initial states of these mobile objects will be collectively referred to as a travel timing schedule in an initial state. As a method for generating the travel timing schedule in the initial state, information regarding at least one of time of arrival at and time of departure from the designated area in the route plan is set to each mobile object using an arbitrary method. For example, time of arrival at or departure from each designated area is calculated on the basis of standard speed of the mobile object and a period length required for work, and information of the calculated time is set. In a case where there is a condition (for example, a speed pattern) regarding speed at which the mobile objects travel on each traveling path, the travel timing schedule is generated so as to satisfy the condition regarding the speed. Alternatively, it is also possible to divert part of the travel timing schedule which has been previously generated (portion after the update position) as is.

The travel timing scheduler 105 detects a pair of two mobile objects between which conflict occurs first in a time direction and an arc (traveling path) on which conflict occurs on the basis of the travel timing schedule in the initial state (detection processing) (step 23). As an example, time at which conflict occurs first is specified for each of all combinations of two individual travel schedules in the travel timing schedule in the initial state. Time which is temporally earliest among the specified time is selected, and a pair of two mobile objects between which conflict occurs at the selected time and an arc (traveling path) on which the conflict occurs are detected.

Figure 13C:
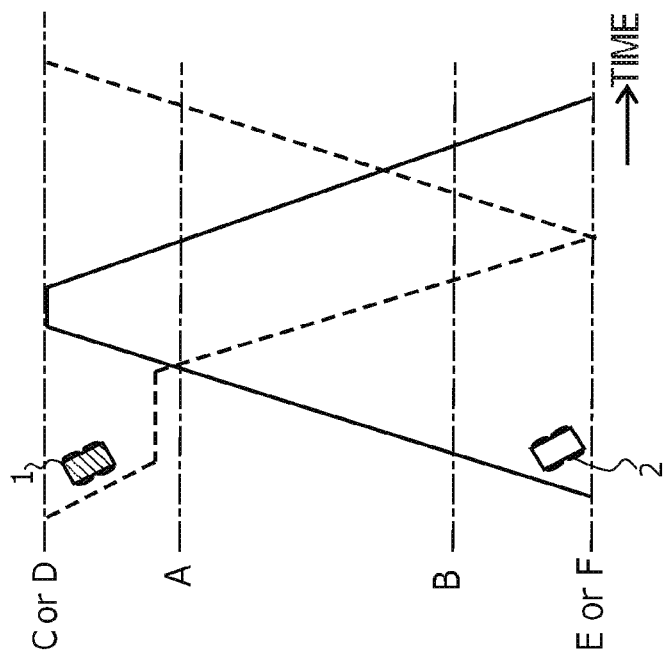
FIGS. 13A to 13C each are a diagram illustrating an example of conflict check and avoidance processing.
Figure 13B:
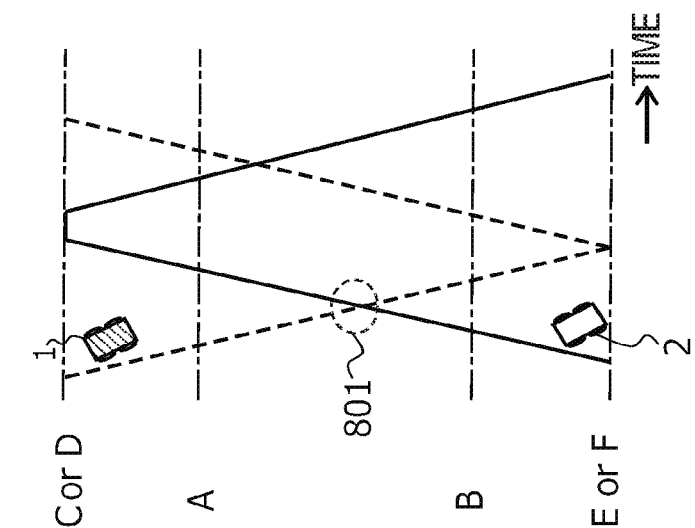
Figure 13A:
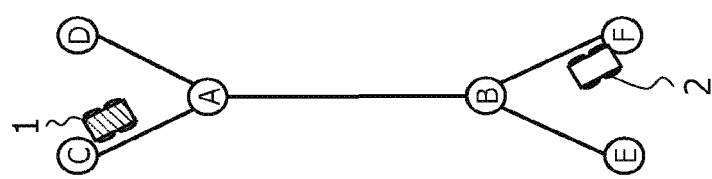

FIG. 13A is a diagram for explaining an example where conflict will occur in a case where two mobile objects (indicated as a mobile object 1 and a mobile object 2) travel in a travel network with a simple structure. It is assumed here that the route plane of the mobile object 1 and the route plan of the mobile object 2 defines that the mobile object 1 travels back and forth between the node C and the node E, and the mobile object 2 travels back and forth between the node F and the node D.

On the traveling path (section AB) between the node A and the node B, the mobile object 1 and the mobile object 2 travel in directions reverse to each other. If the mobile object 1 and the mobile object 2 keep traveling as it is, in a case where the mobile object 1 and the mobile object 2 cannot travel backward on the traveling path, deadlock occurs. Even if at least one of the mobile object 1 and the mobile object 2 can travel backward, efficiency drastically degrades due to stop and backward traveling for avoiding a collision.

FIG. 13B is a graph indicating movement trajectories of the mobile object 1 and the mobile object 2 over time on the basis of the travel timing schedules in the initial states of the mobile object 1 and the mobile object 2. A graph with a dashed line is a graph for the mobile object 1, and a graph with a solid line is a graph for the mobile object 2. Whether or not there occurs conflict can be detected by checking intersections of the movement trajectories for each traveling path (section). In this example, the movement trajectories of the mobile object 1 and the mobile object 2 intersect at a point 801 in the section AB. Therefore, it is possible to detect occurrence of conflict between the mobile object 1 and the mobile object 2 in the section AB.

FIG. 14A is a diagram for explaining another example where conflict (collision) occurs in a case where two mobile objects (indicated as a mobile object 1 and a mobile object 2) travel. It is assumed here that the route plan of the mobile object 1 and the route plan of the mobile object 2 defines that the mobile object 1 travels back and forth between the node E and the node C, and the mobile object 2 travels back and forth between the node F and the node D.

The mobile object 1 and the mobile object 2 travel in the same direction in the section AB. Because the section AB has a traveling network structure in which passing is impossible, in a case where movement speed of the mobile object 1 is different from movement speed of the mobile object 2, a rear-end collision or temporary stop can occur in the section AB. As a result of temporary stop and re-traveling for preventing a rear-end collision being repeated, traveling efficiency may degrade.

FIG. 14B is a graph illustrating the movement trajectories of the mobile object 1 and the mobile object 2 over time on the basis of the timing schedules (initial states) of the mobile object 1 and the mobile object 2. A graph with a dashed line is a graph for the mobile object 1, and a graph with a solid line is a graph for the mobile object 2. While the mobile object 2 departs behind the mobile object 1, because the speed of the mobile object 2 is faster than the speed of the mobile object 1, the mobile object 2 collides with the mobile object 1 from behind. The movement trajectory of the mobile object 1 intersects with the movement trajectory of the mobile object 2 at a point 802, and the mobile object 1 collides with the mobile object 2 at a position corresponding to the point 802. In this manner, it is possible to detect occurrence of conflict between the mobile object 1 and the mobile object 2 in the section AB.

In a case where a pair of mobile objects between which conflict may occur can be detected in step 23 (step 24: No), a plurality of measures or at least one measure for avoiding the conflict is determined for an arc (conflict arc) in which the conflict will occur. For example, it is possible to avoid the corresponding conflict by performing operation of causing the mobile object of one of the mobile objects in the pair to wait in an arc (traveling path) or at a designated area on an upstream side of the conflict arc. In this case, it can be said that there are two measures. Therefore, at least one of individual travel schedules of at least two mobile objects between which conflict occurs for each of the two measures is changed. An aggregate of individual travel schedules of a plurality of mobile objects for which the individual travel schedule of at least one of the two mobile objects has been changed is generated as a tentative travel timing schedule (update processing) (step 25). Note that the changed individual travel schedule may be referred to as a tentative individual travel schedule.

For example, it is assumed that a plurality of mobile objects 1 to H (H is an integer equal to or greater than 2) exist. In a case where the mobile object 1 conflicts with the mobile object 2, there are two measures: a measure in which the mobile object 1 is caused to wait and a measure in which the mobile object 2 is caused to wait. In this case, the individual travel schedule of at least one of the mobile objects 1 and 2 among the individual travel schedules of the mobile objects 1 to H is changed for each measure. The tentative travel timing schedule including the individual travel schedules of the mobile objects 1 to H for which the individual travel schedule of at least one of the mobile objects 1 and 2 has been changed is generated. By this means, the tentative travel timing schedule is generated for each measure. That is, two tentative travel timing schedules are obtained from one travel timing schedule (or the tentative travel timing schedule).

The tentative travel timing schedule will be referred to as a "travel timing schedule in a transitioned state". The travel timing schedule upon start of the processing in the present flowchart will be referred to as a "travel timing schedule in an initial state".

FIG. 13C illustrates an operation example of conflict avoidance in step 25. FIG. 13C illustrates an example where conflict is avoided by the mobile object 1 waiting or adjusting speed (reducing speed) on an arc CA located upstream of an arc (traveling path) AB to avoid conflict at a point 801 detected in FIG. 13B. As another method for avoiding conflict detected in FIG. 13B, it is also possible to employ a method where the mobile object 2 waits or adjusts speed (reduces speed) on a traveling path FB located upstream of the traveling path BA. By performing operation of conflict avoidance in this manner, the movement trajectory of the mobile object 1 does not intersect with the movement trajectory of the mobile object 2 on the traveling path AB. Therefore, conflict is avoided.

FIG. 14C and FIG. 14D illustrate another operation examples of conflict avoidance in step 25. FIG. 14C illustrates an example where conflict is avoided by the mobile object 1 waiting on a traveling path EB located upstream of the traveling path BA in order to avoid conflict at a point 802 detected in FIG. 14B. In a similar manner, FIG. 14D illustrates an example where conflict is avoided by the mobile object 2 waiting on a traveling path FB located upstream of the BA.

The travel timing scheduler 105 calculates (predicts) the evaluation value based on the model for each tentative travel timing schedule (the travel timing schedule in the transitioned state) using the evaluation value calculator 114 (calculation processing). While the evaluation value is calculated using the evaluation function defined in advance in a case where the model has not been generated yet, this will be described later. The travel timing scheduler 105 adds the respective tentative travel timing schedules (the travel timing schedules in the transitioned states) and the respective evaluation values to a search list in association with each other (step 26). The search list is a list in which a plurality of tentative travel timing schedules (travel timing schedules in the transitioned states) which are being processed are temporarily stored.

The travel timing scheduler 105 sorts the respective tentative travel timing schedules (the travel timing schedules in the transitioned states) within the search list in descending order of the evaluation values (step 27). The travel timing scheduler 105 extracts a tentative travel timing schedule (travel timing schedule in the transitioned state) at the head of the search list as a target to be searched next (selection processing) (the same step 27).

The travel timing scheduler 105 judges whether a calculation period falls within a predetermined time limit or whether or not the number of times of repetition falls within a predetermined number of times (step 28). An arbitrary range in the flowchart can be set as a target for judging the number of times of repetition. For example, the number of times of repetition may be the number of times of repetition of processing from step 23 to 28. If the calculation period falls within the time limit or the number of times of repetition falls within the predetermined number of times (step 28: Yes), the processing returns to step 23. In step 23, detection process (of detecting a pair of mobile objects which conflicts with an arc at which conflict occurs first. Conflict detected last time or before the last time has been solved) is continuously performed where the tentative travel timing schedule (travel timing schedule in the transitioned state) extracted in step 27 is newly regarded as the travel timing schedule in the initial state.

In a case where it is judged that conflict does not occur in the tentative travel timing schedule (travel timing schedule in the transitioned state) newly regarded as the travel timing schedule in the initial state in step 23 (step 24: Yes), this is set as a candidate for the travel timing schedule to be output. Therefore, the corresponding tentative travel timing schedule (travel timing schedule in the transitioned state) is moved to a solution list from the search list as the candidate for the travel timing schedule along with the evaluation value (step 31). The solution list is a list in which candidates for the travel timing schedule to be output are temporarily stored.

The travel timing scheduler 105 sorts items in the solution list in order of the evaluation values (step 32).

The travel timing scheduler 105 extracts the tentative travel timing schedule (travel timing schedule in the transitioned state) at the head of the search list as the next processing target (step 33), and the processing returns to step 23 while this tentative travel timing schedule is regarded as the travel timing schedule in the initial state.

In a case where the calculation period exceeds the time limit or the number of times of repetition exceeds the predetermined number of times (step 28: No), the travel timing scheduler 105 checks whether the solution list includes at least one candidate for the travel timing schedule (step 29). In a case where the solution list is not empty (step 29: No), a candidate for the travel timing schedule at the head of the solution list is output as a solution. That is, an aggregate of the individual travel schedules (tentative individual travel schedules) of the respective mobile objects included in the candidate is output as the updated travel timing schedule (step 30). Because items in the solution list are sorted in descending order of the evaluation values, the candidate at the head of the solution list is a travel timing schedule with the highest evaluation.

Meanwhile, in a case where the solution list is empty (step 29: Yes), the travel timing scheduler 105 extracts the tentative travel timing schedule (travel timing schedule in the transitioned state) at the head of the search list as a solution (step 34). A range of a period (a plan portion which is partially completed) in which conflict has been solved in the tentative individual travel schedule of each mobile object in the extracted solution is specified, and the travel timing schedule including the plan portion of the specified range is output as the individual travel schedule of each mobile object (step 35).

Figure 15:
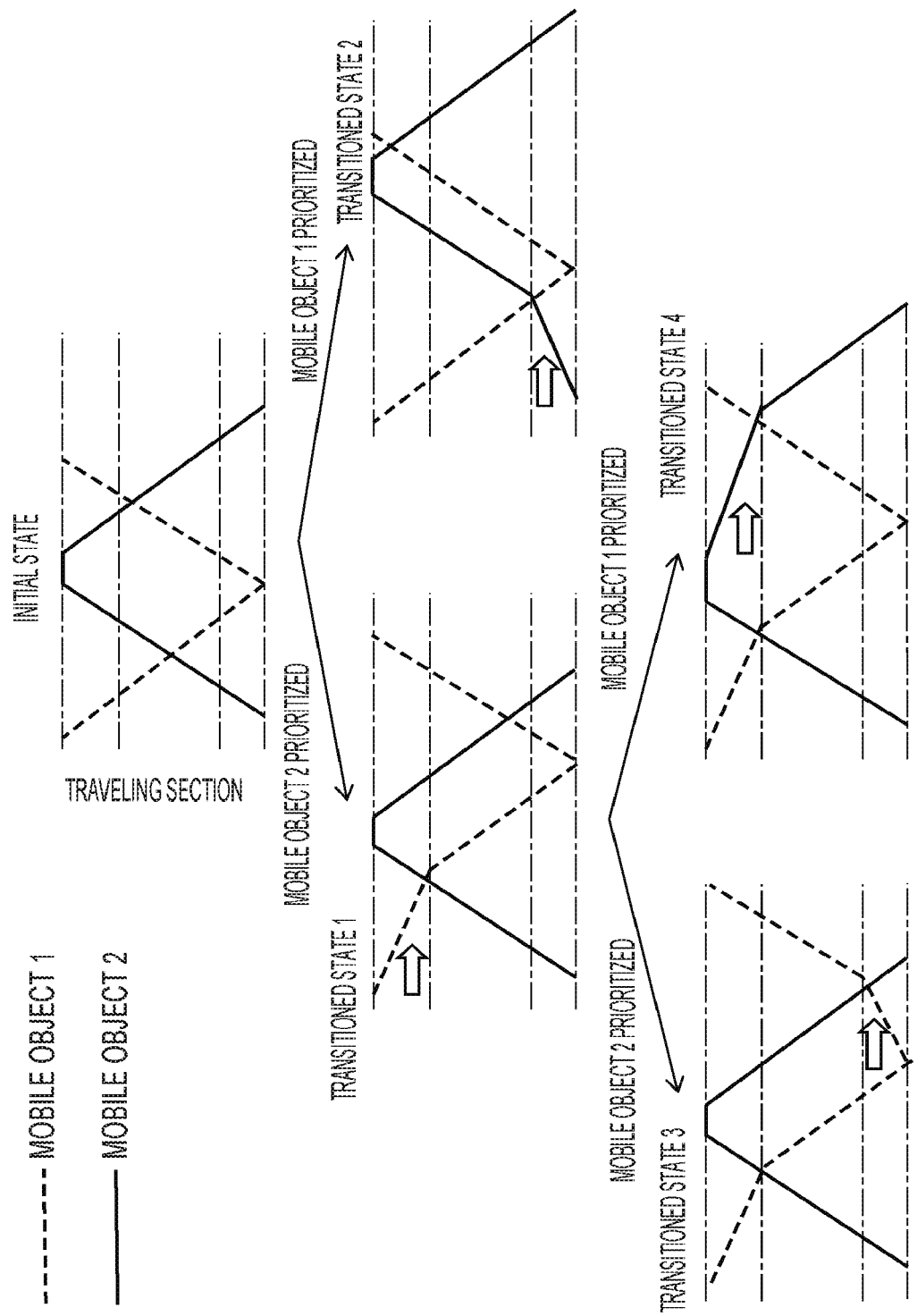
FIG. 15 is a conceptual diagram of search processing of the travel timing scheduler.

FIG. 15 illustrates an example of a search tree in search processing of the travel timing scheduler in the flowchart in FIG. 12. The initial state at the top of FIG. 15 is a state corresponding to the travel timing schedule illustrated in FIG. 13B (however, a scale is changed).

There are two patterns of conflict avoidance measures of a case where the mobile object 1 is caused to wait and a case where the mobile object 2 is caused to wait, for the traveling path (conflict arc) at which traveling in reverse directions occurs. Time at which conflict will occur next and the traveling path on which conflict will occur next change depending on which of the mobile objects is caused to wait to avoid conflict. In step 25 in FIG. 12, if operation of prioritizing the mobile object 2 (operation of causing the mobile object 1 to wait) is performed, the travel timing schedule in a transitioned state 1 (tentative travel timing schedule 1) can be obtained, while, if operation of prioritizing the mobile object 1 (operation of causing the mobile object 2 to wait) is performed, the travel timing schedule in a transitioned state 2 (tentative travel timing schedule 2) can be obtained. Note that an outline arrow in the drawing indicates a changed portion in the graph.

The evaluation values are respectively acquired for the travel timing schedule in the transitioned state 1 and the travel timing schedule in the transitioned state 2, and the travel timing schedule in the transitioned state 1 and the travel timing schedule in the transitioned state 2 are stored in the search list along with the respective evaluation values (step 26 in FIG. 12). Items in the search list are sorted in descending order of the evaluation values, and, because the evaluation value of the travel timing schedule in the transitioned state 1 is greater, the travel timing schedule in the transitioned state 1 is selected (step 27 in FIG. 12).

Search recursively proceeds while the travel timing schedule in the transitioned state 1 is regarded as the travel timing schedule in the initial state (step 23 in FIG. 12). The travel timing schedule in a transitioned state 3 (tentative travel timing schedule 3) and the travel timing schedule in a transitioned state 4 (tentative travel timing schedule 4) are obtained depending on which of the mobile object 2 and the mobile object 1 is prioritized. The evaluation values are respectively acquired for the travel timing schedule in the transitioned state 3 and the travel timing schedule in the transitioned state 4. The travel timing schedule in the transitioned state 3 and the travel timing schedule in the transitioned state 4 are stored in the search list along with the respective evaluation values (step 26 in FIG. 12).

In the search list, the travel timing schedule in the transitioned state 2, the travel timing schedule in the transitioned state 3, and the travel timing schedule in the transitioned state 4 at this time point are stored along with the respective evaluation values. Among these, the travel timing schedule with the greatest evaluation value is selected, and processing recursively proceeds while this is regarded as the timing schedule set in the initial state (step 23).

In this manner, in the search algorithm in FIG. 12, combinations of conflict avoidance measures are sequentially searched. If the number of mobile objects is large or the number of conflict arcs is large, the number of combinations of the conflict avoidance measures becomes enormous, which typically makes it difficult to generate plans in real time; however, in the search algorithm in FIG. 12, an evaluation value of the travel timing schedule in the transitioned state which is to be examined next is predicted using the evaluation function or the model, and search is preferentially performed from the travel timing schedule with a higher evaluation value. Therefore, it is possible to perform efficient search.

At this time, by applying a search method called heuristic optimal solution search algorithm ("A search"), it is possible to obtain a travel timing schedule with high evaluation in a short period of time. In the A search, a sum of the evaluation value calculated for a portion where update is completed in a state where search is being performed, and a predicted value of the evaluation value for a portion where update is not performed is set as the evaluation value. For example, the evaluation value is calculated on the basis of a sum of a delay time corresponding to a route (searched circuit) on which conflict has been solved in the target travel timing schedule and a predicted value of a delay time, for example, assuming that there will be completely no conflict for the remaining route (unsearched route) after the route on which conflict has been solved. Alternatively, the evaluation value is calculated on the basis of a delay time, for example, assuming that there will be completely no conflict for the unsearched route.

In the present embodiment, it is possible to estimate the evaluation value assumed for the unsearched route with high accuracy at high speed using the model, so that search efficiency is improved.

While the evaluation value is calculated (predicted) using the model in step S26 in the description of the flowchart in FIG. 12, in a case where the model has not been generated yet, or in a case where, even if the model is generated, update of the model is performed in parallel, the evaluation value is calculated using the evaluation function. At this time, a delay time (set as a delay time X) to adjust time for solving conflict in the tentative travel timing schedule (set as a tentative travel timing schedule A) is obtained, and in the unsearched route, a delay time (set as a delay time Y) is predicted assuming that delay may occur at a fixed rate in accordance with the remaining traveling distance. Then, the evaluation value is calculated on the basis of a sum of the delay time X and the delay time Y. Then, it is assumed that, in the subsequent processing, the tentative travel timing schedule A is selected, operation of solving conflict is performed, and a new tentative travel timing schedule (tentative travel timing schedule B) is generated. That is, it is assumed that the tentative travel timing schedule B is generated as a child node of the tentative travel timing schedule A. The evaluation value is calculated for the tentative travel timing schedule B in a similar manner to the tentative travel timing schedule A. At this time, the evaluation value of the tentative travel timing schedule A is updated by substituting a delay time (set as a delay time Z) of the evaluation value calculated for the tentative travel timing schedule B for the above-described delay time Y predicted in the tentative travel timing schedule A. That is, the evaluation value is calculated on the basis of a sum of the delay time X and the delay time Z, and the evaluation value of the tentative travel timing schedule A is updated with the calculated evaluation value. By this means, it is possible to make accuracy of the evaluation value of the tentative travel timing schedule A higher. Update of the evaluation value is performed as the search proceeds in this manner, and the evaluation value at a time point at which the search processing is finally completed is used as the evaluation value of the search log. A calculation method of the evaluation value described in the present paragraph is an example, and it is also possible to use other methods.

Here, the processing in step 21 in FIG. 11 described above will be supplementarily described. When the search processing (see FIG. 12) of the travel timing scheduler 105 is finished, respective transitioned states of the search tree are tracked back from a transitioned state (transitioned state 4) at a last edge to the initial state, for example, in the search tree as illustrated in FIG. 15. Sets of the evaluation values in the respective transitioned states (for example, a result value of a sum of delay times for adjusting time after the transitioned state), state features of a plurality of mobile objects in the respective transitioned states, and respective search depths are set as a plurality of search logs, and the plurality of search logs are stored in the search log storage 111. For example, in a case of the example in FIG. 15, a search log which is a set of state features of a plurality of mobile objects in the transitioned state 1, a sum of delay times for adjusting time occurring from the transitioned state 1 to the next transitioned state 4, and a search depth (=1) of the transitioned state 1 is stored. Further, a search log which is a set of state features of a plurality of mobile objects in the initial state, a sum of delay times for adjusting time occurring from the initial state to the transitioned state 4 by way of the transitioned state 1, and a search depth (=0) in the initial state is stored. In a case where the search logs created for the past travel timing schedules are stored in the search log storage 111, it is also possible to add the search log of this time to the past search logs or discard part of the past search logs and add the search log of this time.

As described above, according to the present embodiment, it is possible to draw up travel plans of a plurality of mobile objects quickly while avoiding conflict such as deadlock or a collision. Even if a mobile object is newly introduced, or a pattern of work of the mobile object or a traffic line of the mobile object fluctuates, it is possible to cause the mobile objects to travel without degrading traveling efficiency.

Hardware Configuration

Figure 16:
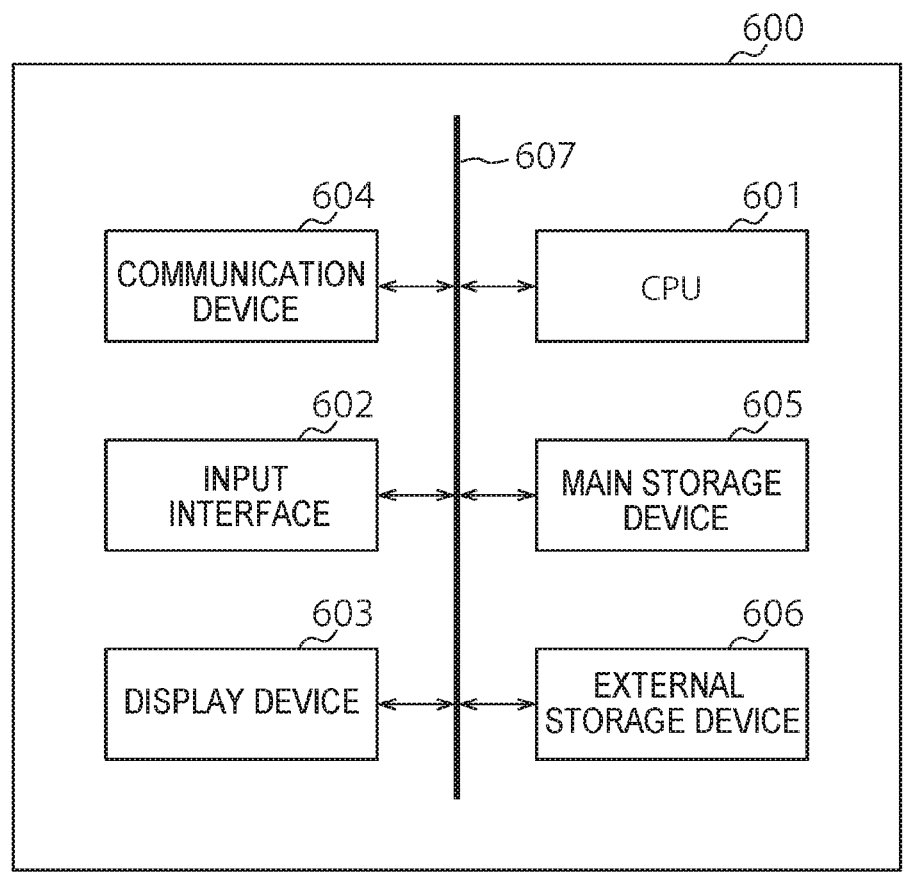
FIG. 16 is a hardware block diagram of a travel planning device.

FIG. 16 illustrates a hardware configuration of the travel planning device 100 according to any one of the first to third embodiments. The travel planning device 100 according to the present embodiment is configured with a computer device 600. The computer device 600 includes a CPU 601, an input interface 602, a display device 603, a communication device 604, a main storage device 605 and an external storage device 606, and these are connected to each other with a bus 607. The travel management device 200 in FIG. 1 can be also configured by the hardware configuration similar to that of FIG. 16.

The CPU (Central Processing Unit) 601 executes a computer program (travel control program) which realizes the above-described respective functional configurations of the travel planning device 100 on the main storage device 605. The computer program may be configured by not only a single program but also a plurality of programs, scripts or combinations thereof. By the CPU 601 executing the computer program, the respective functional configurations are realized.

The input interface 602 is a circuit for inputting an operation signal from the input device such as a keyboard, a mouse and a touch panel, to the travel planning device 100.

The display device 603 displays data or information output from the travel planning device 100. While the display device 603 is, for example, an LCD (Liquid Crystal Display), a CRT (Cathode-Ray Tube), and a PDP (Plasma Display Panel), the display device 603 is not limited to this. The data or the information output from the computer device 600 can be displayed by this display device 603.

The communication device 604 is a circuit for the travel planning device 101 to communicate with an external device in a wireless or wired manner. Information can be input from the external device via the communication device 604. Information input from the external device can be stored in a DB. A constitution for performing communication in the travel planning device can be constructed on the communication device 604.

The main storage device 605 stores a program which realizes processing of the present embodiment, data required for execution of the program, data generated by execution of the program, and the like. The program is developed and executed on the main storage device 605. While the main storage device 605 is, for example, a RAM, a DRAM and an SRAM, the main storage device 605 is not limited to this. The storage or the database in FIG. 1 may be constructed on the main storage device 605.

The external storage device 606 stores the above-described program, data required for execution of the program, data generated by execution of the program, and the like.

These kinds of program and data are read out to the main storage device 605 upon processing of the present embodiment. While the external storage device 606 is, for example, a hard disk, an optical disk, a flash memory and a magnetic tape, the external storage device 606 is not limited to this. The storage or the database in FIG. 1 may be constructed on the external storage device 606.

Note that the above-described program may be installed in the computer device 600 in advance or may be stored in a storage medium such as a CD-ROM. Further, the program may be uploaded on the Internet.

Further, the travel planning device 100 may be configured with a single computer device 600 or may be configured as a system including a plurality of computer devices 100 which are connected to each other.

Second Embodiment

Figure 17:
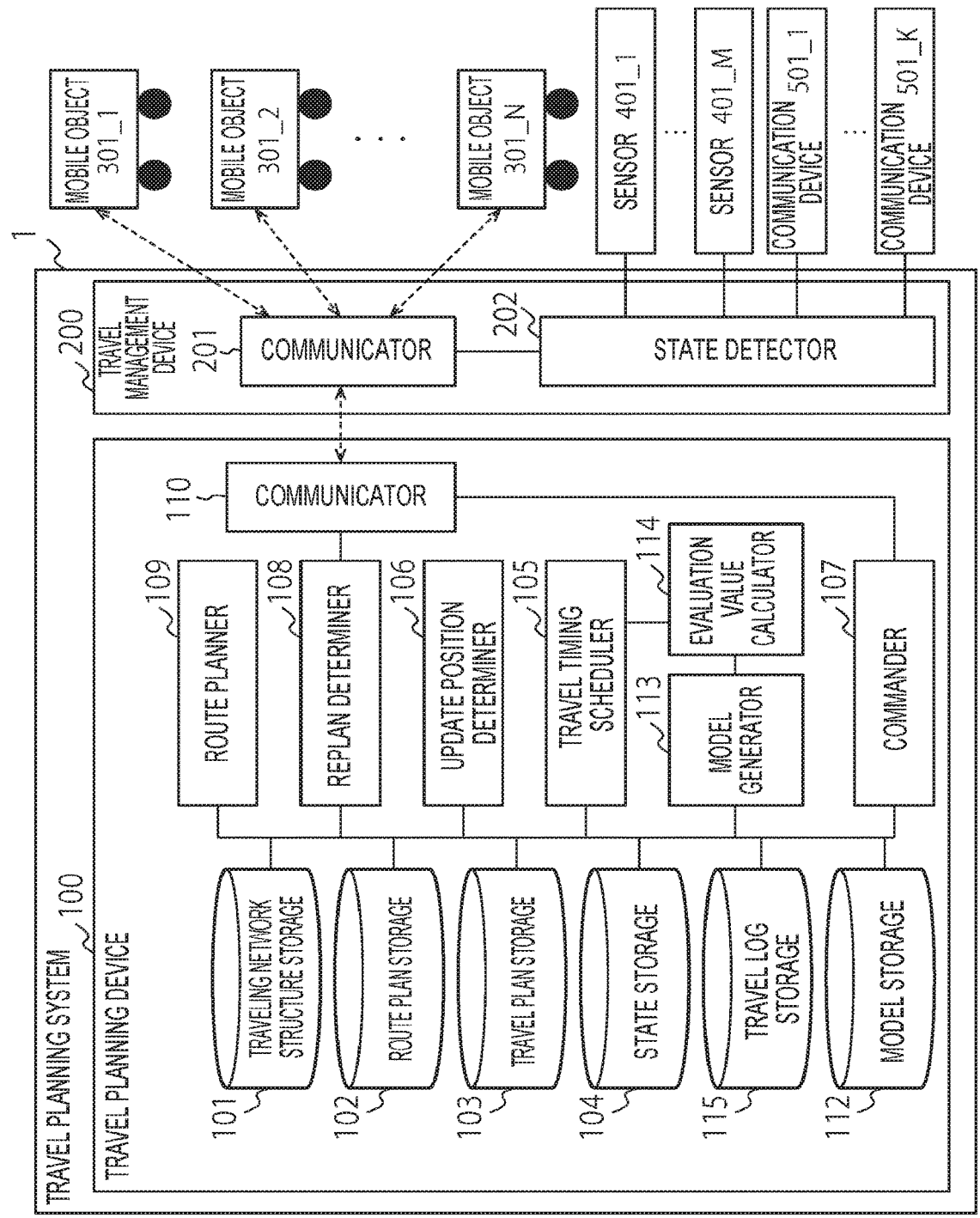
FIG. 17 is a diagram illustrating an example of an entire system configuration including a travel planning system according to a second embodiment.

FIG. 17 illustrates an example of an entire system configuration including a travel planning system according to a second embodiment. The search log storage 111 in FIG. 1 is replaced with a travel log storage 115. The same reference numerals will be assigned to blocks having the same name as that in FIG. 1, and description will be omitted as appropriate except extended or changed processing.

The travel timing scheduler 105 generates data (second data) which is sets of state features of a plurality of mobile objects in the respective transitioned states, and search depths in the respective transitioned states, as travel logs. The travel timing scheduler 105 stores the generated travel logs in the travel log storage 115. In a case where travel logs generated for the past travel timing schedules are stored in the travel log storage 115, it is also possible to add the travel log of this time to the past travel logs, or discard part of the past travel logs and add the travel log of this time.

An evaluation value (second evaluation value) of the travel log is calculated (measured) on the basis of an actual traveling result, and added to the travel log as the evaluation value (second evaluation value) corresponding to the state feature of each mobile object. Because a form of the travel log is the same as that of the search log in the first embodiment, illustration of the travel log will be omitted.

The travel log storage 115 stores the travel logs generated by the travel timing scheduler 105.

The model generator 113 generates a model on the basis of the travel logs stored in the travel log storage 115. Specifically, in a similar manner to the first embodiment, a model for predicting the evaluation value from state features of a plurality of mobile objects is generated. Because a type of the model is the same as that in the first embodiment, description will be omitted.

Figure 18:
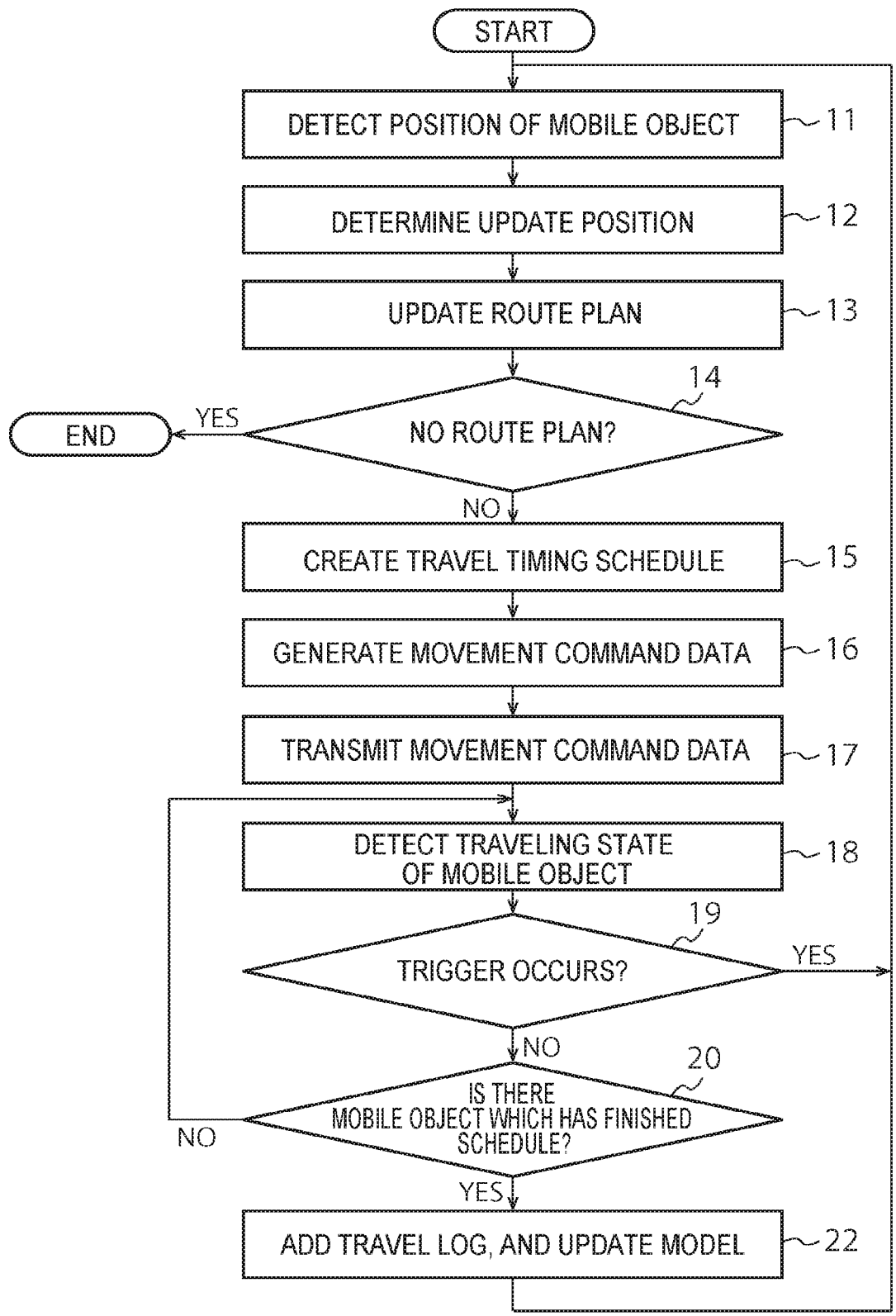
FIG. 18 is a flowchart of processing of the travel planning system according to the second embodiment.

FIG. 18 is a flowchart of overall operation of the travel planning system 1 according to the second embodiment. A difference from the flowchart in FIG. 11 of the first embodiment is that step 21 after step 15 is deleted, and step 22 is added after Yes in step 20.

In step 22, the travel timing scheduler 105 adds the travel logs of the mobile objects which have completed operation to the travel log storage 115, and the model generator 113 generates or updates the model on the basis of the travel logs stored in the travel log storage 115. When a model has not existed yet in the model storage 112, a model is generated, while, when a model has already existed, the model is updated. Accuracy of the model is calculated using the model and the travel logs. For example, the evaluation value is calculated (predicted) with the model using state features of a plurality of mobile objects in the travel logs as input. A difference between the predicted evaluation value and the evaluation value (second evaluation value) included in the travel log is calculated. If an average value of the difference is equal to or greater than a threshold, it is judged that accuracy of the model is high, while the average value of the difference is less than the threshold, it is judged that the accuracy is low. In a case where it is judged that the accuracy is high, in the next and subsequent step 15, the evaluation value is predicted using the model. The model generator 113 may notify information as to whether a model with high accuracy can be obtained to the travel timing scheduler 105. In a case where the evaluation value is predicted using the model, step 21 may be omitted, or step 21 may be executed.

Note that, in step 15, before the model is generated, the evaluation value in each transitioned state (tentative travel timing schedule) is calculated with the evaluation function defined in advance in a similar manner to the first embodiment, and the tentative travel timing schedule is selected on the basis of the evaluation value. Then, the travel timing schedule is updated on the basis of the selected tentative travel timing schedule. Calculation of the evaluation value (second evaluation value) based on the traveling result is performed separately from calculation of the evaluation value in the search processing.

Also after the model with high accuracy can be obtained, the evaluation value may be regularly calculated on the basis of the traveling result in step 15, the travel log may be added to the travel log storage 115, and the model may be updated in step 22.

According to the present embodiment, by generating a model using the evaluation value (second evaluation value) calculated on the basis of the traveling result, it is possible to predict an evaluation value with high accuracy.

Third Embodiment

A third embodiment is an embodiment in which the first embodiment and the second embodiment are combined.

Figure 19:
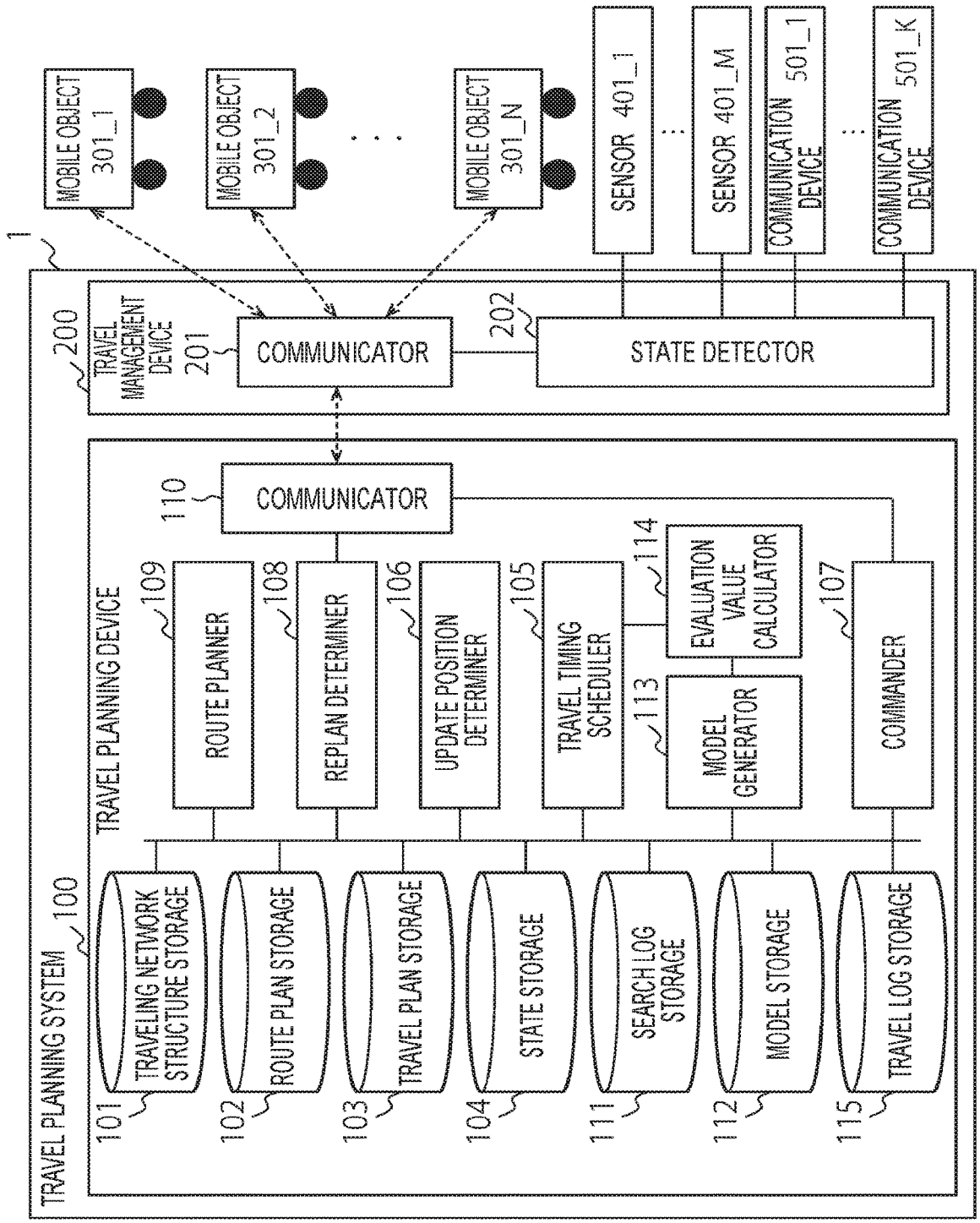
FIG. 19 is a diagram illustrating an example of an entire system configuration including a travel planning system according to a third embodiment.

FIG. 19 illustrates an example of an entire system configuration including a travel planning system according to the third embodiment. The travel log storage 115 is added to the travel planning system in FIG. 1. The model generator 113 generates or updates the model using both the search logs in the search log storage 111 and the travel logs in the travel log storage 115. The search logs and the travel logs may be collectively stored in one storage. By using the both logs, it becomes possible to realize learning of a model with high accuracy.

Figure 20:
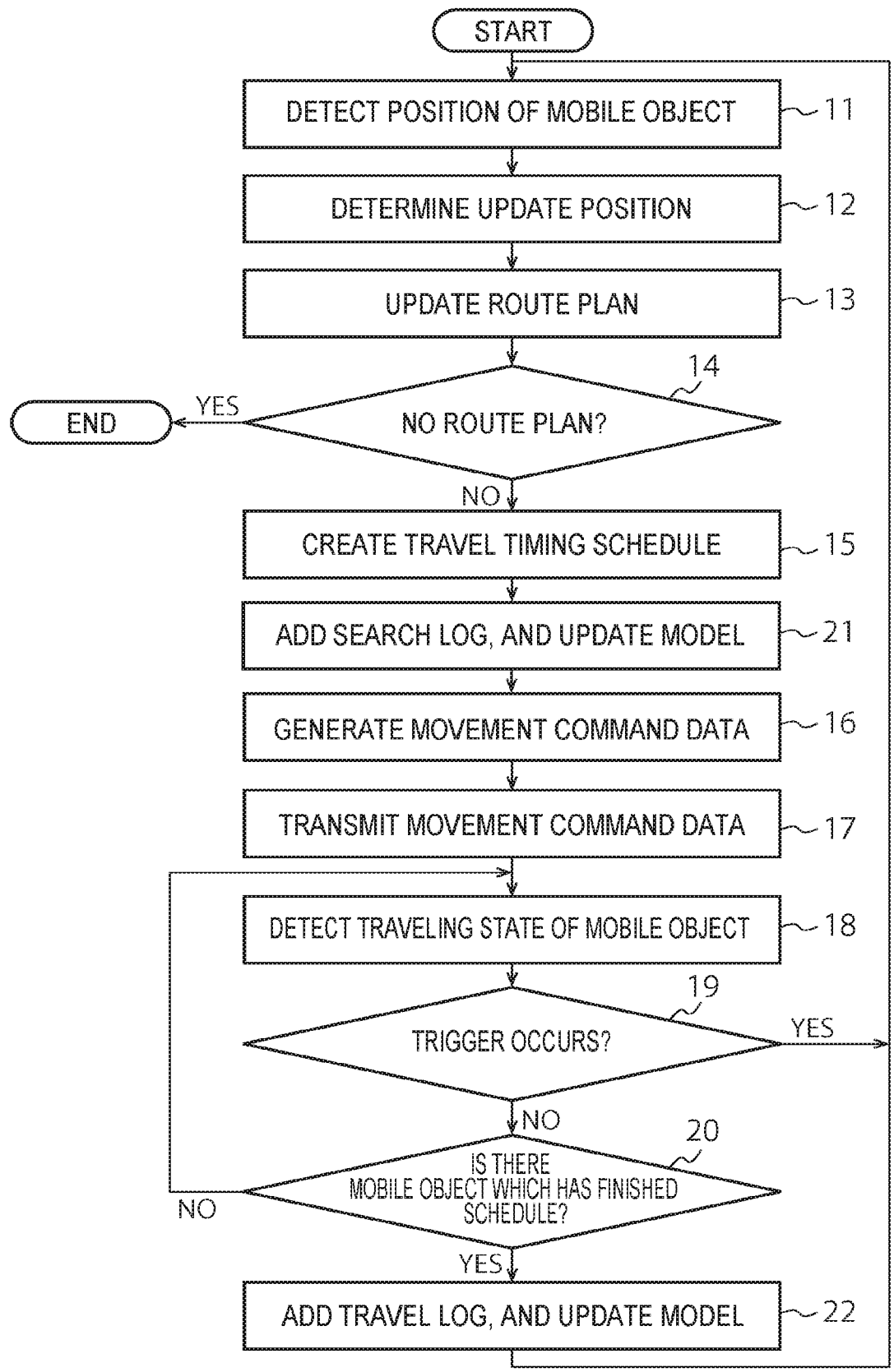
FIG. 20 is a flowchart of processing of the travel planning system according to the third embodiment.

FIG. 20 is a flowchart of overall operation of the travel planning system 1 according to the third embodiment. Step 22 is added after Yes in step 20 in the flowchart in FIG. 11 in the first embodiment. Processing in step 22 is the same as that in the second embodiment. Because details of the processing illustrated in FIG. 20 are obvious from the description of the first and the second embodiments, description will be omitted.

Fourth Embodiment

Figure 21:
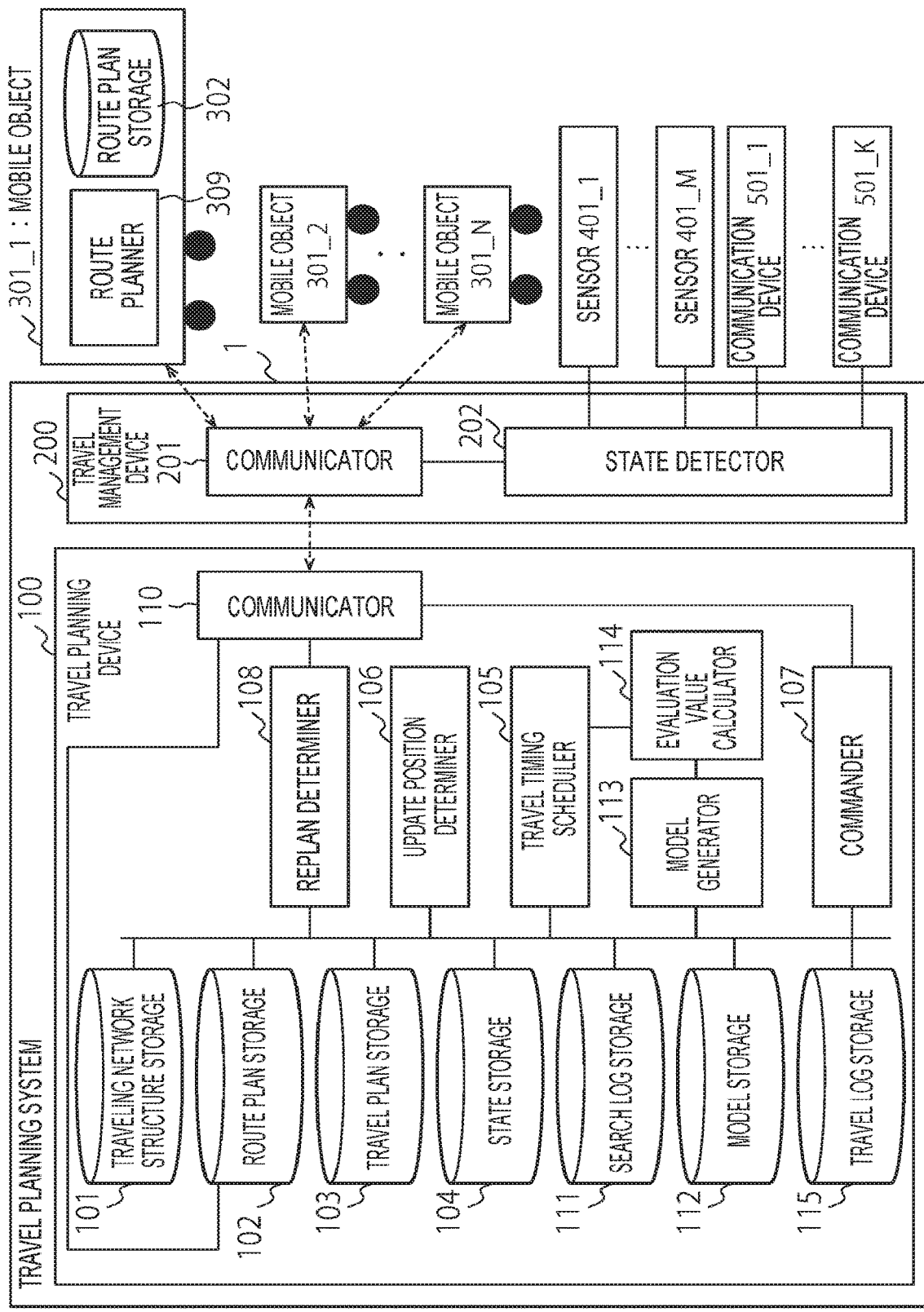
FIG. 21 is a diagram illustrating an example of an entire system configuration including a travel planning system according to a fourth embodiment.

FIG. 21 illustrates an example of an entire system configuration including a travel planning system according to a fourth embodiment. Each mobile object includes a route planner 309 and a route plan storage 302, and the travel planning device 100 does not include a route planner. The route planner 309 has functions similar to those of the route planner 109 in FIG. 1. While the fourth embodiment is an embodiment obtained by partially changing the third embodiment, the first embodiment or the second embodiment may be similarly changed.

The route planner 309 of each mobile object autonomously determines a route plan and stores the route plan in the route plan storage 302. Further, each mobile object transmits data of the route plan to the travel planning device 100 via the communicator 201 of the travel management device 210 or the communication device 501. The travel planning device 100 stores the route plan of each mobile object in the route plan storage 102. The route planner 309 does not have to be provided at each mobile object, and a route (traveling paths) of each mobile object may be stored in the route plan storage 302 of each mobile object in advance.

In the fourth embodiment, a case is assumed where each mobile object is an autonomous type mobile robot including SLAM, an autonomous traveling vehicle, construction machine, or the like, and travels on the route (traveling paths) under management of the travel planning device 100 and the travel management device 200. Because the route plan of each mobile object is determined in advance or each mobile object autonomously determines a route plan, a case is assumed where the route plan of each mobile object cannot be freely changed on the travel planning device 100 side and the travel management device 200 side. Even in such a case, by appropriately generating the travel timing schedule at the travel planning device 100 and instructing each mobile object on the movement command data, it is possible to ensure traveling in which a collision, deadlock, or the like, does not occur. If the travel timing schedule which prevents occurrence of a collision or deadlock cannot be generated, the travel planning device 100 may transmit a request for changing the route plan to each mobile object via the travel management device 200.

Fifth Embodiment

Figure 22:
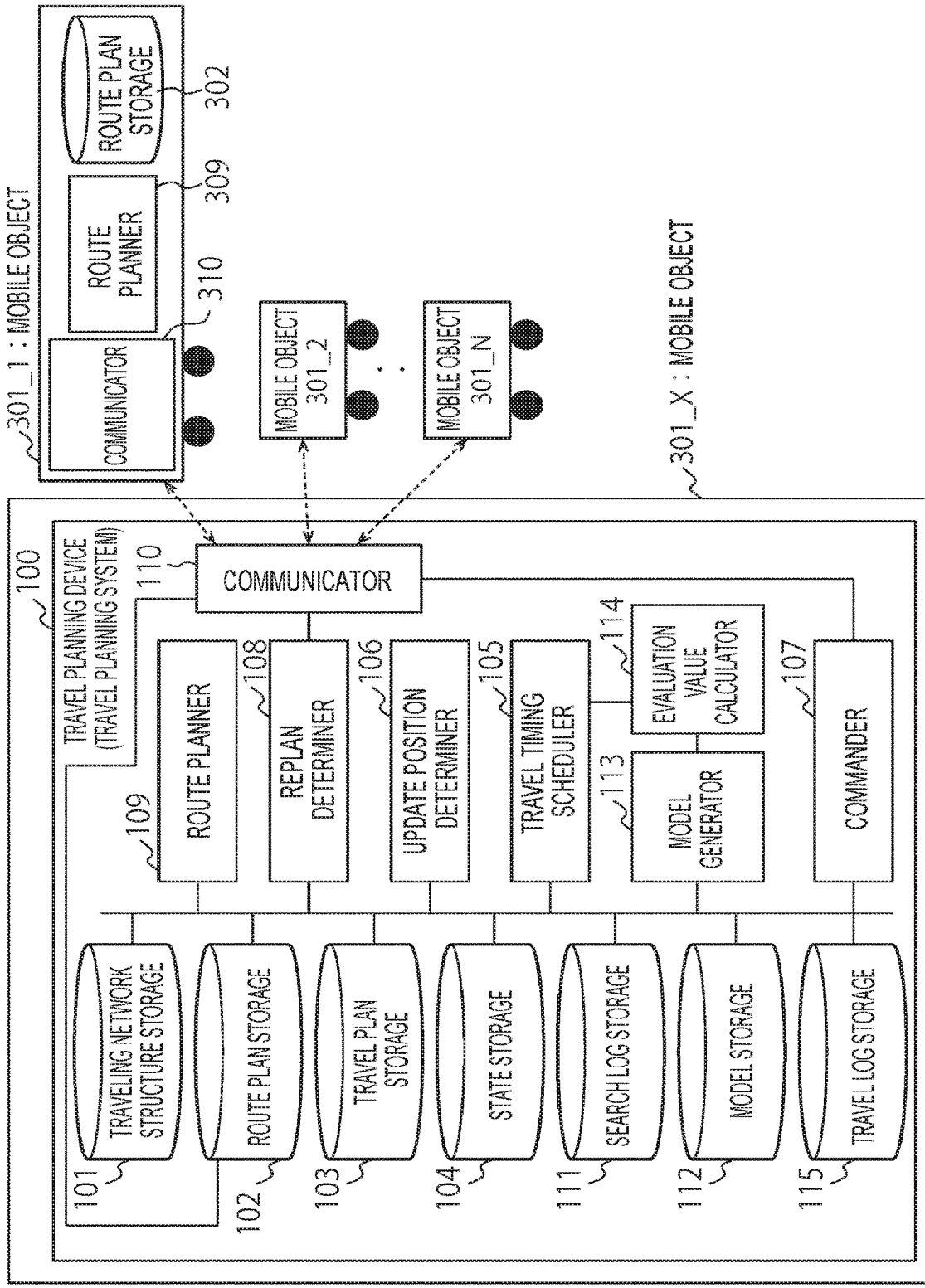
FIG. 22 is a diagram illustrating an example of an entire system configuration including a travel planning system according to a fifth embodiment.

FIG. 22 illustrates an example of an entire system configuration including a travel planning system according to a fifth embodiment. In the present embodiment, while basic functional parts are the same as those in the first to the fourth embodiment, at least one mobile object includes functions corresponding to the travel planning device (or the travel planning system). Other mobile objects include a route planner 309, a route plan storage 302 and a communicator 310. The communicator 310 performs wireless communication with other mobile objects.

One mobile object among mobile objects having functions corresponding to the travel planning device becomes a master. In the drawing, an example is illustrated where a mobile object 301_X becomes a master. The master may be determined through, for example, negotiation among mobile objects having functions corresponding to the travel planning device. Alternatively, the master may be determined in accordance with priority determined in advance. For example, a mobile object with the highest performance or a mobile object with a largest remaining battery amount may become the master. The master may be determined using other methods.

The route planners 309 of mobile objects other than the mobile object 301_X autonomously determine route plans, and then transmit the route plans to the mobile object 301_X which becomes the master. Alternatively, the route plans may be stored in advance in the route plan storage 302. In this case, the route planner 309 reads out data of the route plan within the route plan storage 302 without generating the route plan by itself and transmits the data to the master.

The mobile object 301_X which becomes the master collectively generates traveling timing schedules including the individual travel schedules of a plurality of mobile objects including the own mobile object. The master generates a travel timing schedule so that the route plan of each mobile object is not changed. The mobile object 301_X transmits the movement command data based on the travel timing schedule to each mobile object. Each mobile object controls traveling on the basis of the movement command data. By this means, it is possible to realize efficient traveling as a whole in which a collision, deadlock, or the like, does not occur.

Mobile objects other than the mobile object 301_X do not have to include the route planner 309 and the route plan storage 302. In this case, the mobile objects other than the mobile object 301_X perform operation similar to that of the mobile object which can perform communication with the communicator 201 of the travel management device 200 among the mobile objects in the first embodiment.

The information detected by the state detector 202 in the first or the fourth embodiment is detected by each mobile object by itself in the fifth embodiment, and transmitted to the travel planning device 100 via the communicator 310.

In the fifth embodiment, a case is assumed where each mobile object is an autonomous type mobile robot which include SLAM, an autonomous traveling vehicle, construction machine, or the like, and travels in a travel network having a structure in which traveling in a reverse direction or passing occurs on a single-line traveling path. Because the route plan of each mobile object is determined in advance or each mobile object autonomously determines the route plan, a case is assumed where other persons cannot freely change the route plan. Also in such a case, by the mobile object which becomes the master appropriately generating the travel timing schedule and instructing each mobile object on the travel timing schedule, it is possible to ensure traveling in which a collision or deadlock does not occur. If the travel timing schedule which prevents occurrence of a collision or deadlock cannot be generated, the mobile object which becomes the master may transmit a request for changing the route plan to other mobile objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A travel control device which controls a plurality of mobile objects in a travelling area including a plurality of areas and a plurality of traveling paths connecting among the areas, comprising:
    a controller configured to control traveling of the plurality of mobile objects on a basis of a travel schedule of the plurality of mobile objects;
    a planner configured to generate a plurality of tentative travel schedules in which a conflict among the mobile objects is at least partially resolved by changing part of the travel schedule;
    an evaluation value calculator configured to calculate evaluation values of the tentative travel schedules on a basis of state features of the plurality of mobile objects in the tentative travel schedules; and a model in which the state features of the plurality of mobile objects are associated with evaluation values, wherein the evaluation value calculator calculates the evaluation values on a basis of the model and the state features of the plurality of mobile objects in the tentative travel schedules, and the planner performs search calculation of repeating to select one tentative travel schedule from the plurality of tentative travel schedules on a basis of a plurality of the evaluation values, and to update the travel schedule with the one tentative travel schedule, wherein the conflict comprises one of:

two or more of the mobile objects travel in reverse directions on a traveling path at a same time;

two or more of the mobile objects arrive at an intersection portion leading to a traveling path at a same time, or, one or more of the mobile objects wait at an intersection portion leading to the traveling path while another one of the mobile objects pass through the traveling path.

2. The travel control device according to claim 1, wherein the planner calculates delay times of the plurality of mobile objects occurring in the tentative travel schedules, and calculates the evaluation values on a basis of a sum of the delay times of the plurality of mobile objects, and the travel control device further comprises a model generator configured to acquire first data including the state features of the plurality of mobile objects in the tentative travel schedules and the calculated evaluation values, and generate the model on a basis of a plurality of pieces of the first data.

3. The travel control device according to claim 2, wherein the planner calculates the evaluation values on a basis of a sum of delay times of the plurality of mobile objects occurring in the travel schedule before update and delay times of the plurality of mobile objects occurring in the tentative travel schedules.

4. The travel control device according to claim 1, wherein the evaluation value calculator calculates the evaluation values based on delay times from traveling results of the plurality of mobile objects after traveling of the plurality of mobile objects has been completed, and the travel control device further comprises a model generator configured to acquire second data including the state features of the plurality of mobile objects in the tentative travel schedules, and the calculated evaluation values, and generate the model on a basis of a plurality of pieces of the second data.

5. The travel control device according to claim 1, wherein the state features of the plurality of mobile objects include at least one of position information of the plurality of mobile objects, remaining travel distances of the plurality of mobile objects, and information regarding a package to be conveyed by the plurality of mobile objects.

6. A travel control method which control a plurality of mobile objects in a travelling area including a plurality of areas and a plurality of traveling paths connecting among the areas, the processes comprising:

controlling traveling of a plurality of mobile objects on a basis of a travel schedule of the plurality of mobile objects;

generating a plurality of tentative travel schedules by changing part of the travel schedule;

calculating evaluation values of the tentative travel schedules on a basis of state features of the plurality of mobile objects in the tentative travel schedules using a model in which the state features of the plurality of mobile objects are associated with the evaluation values;

selecting a tentative travel schedule from the plurality of tentative travel schedules on a basis of a plurality of the evaluation values, and updating the travel schedule with the selected tentative travel schedule;

calculating an evaluation value of the tentative travel schedule based on an evaluation function different from the model and travel results of the plurality of mobile objects, and generating data associating the state features of the plurality of mobile objects with the evaluation value calculated;

updating the model based on the data, wherein the conflict comprises one of:

two or more of the mobile objects travel in reverse directions on a traveling path at a same time;

two or more of the mobile objects arrive at an intersection portion leading to a traveling path at a same time, or, one or more of the mobile objects wait at an intersection portion leading to the traveling path while another one of the mobile objects pass through the traveling path.

7. A non-transitory computer readable medium having a computer program stored therein which when executed by a computer, causes the computer to perform processes which control a plurality of mobile objects in a travelling area including a plurality of areas and a plurality of traveling paths connecting among the areas, the processes comprising:

controlling traveling of a plurality of mobile objects on a basis of a travel schedule of the plurality of mobile objects;

generating a plurality of tentative travel schedules by changing part of the travel schedule;

calculating evaluation values of the tentative travel schedules on a basis of state features of the plurality of mobile objects in the tentative travel schedules using a model in which the state features of the plurality of mobile objects are associated with the evaluation values;

selecting a tentative travel schedule from the plurality of tentative travel schedules on a basis of a plurality of the evaluation values, and updating the travel schedule with the selected tentative travel schedule;

calculating an evaluation value of the tentative travel schedule based on an evaluation function different from the model and travel results of the plurality of mobile objects; and generating data associating the state features of the plurality of mobile objects with the evaluation value calculated;

updating the model based on the data, wherein the conflict comprises one of:

two or more of the mobile objects travel in reverse directions on a traveling path at a same time;

two or more of the mobile objects arrive at an intersection portion leading to a traveling path at a same time, or, one or more of the mobile objects wait at an intersection portion leading to the traveling path while another one of the mobile objects pass through the traveling path.

* * * * *